US011254315B2

(12) United States Patent
Berntorp et al.

(10) Patent No.: US 11,254,315 B2
(45) Date of Patent: Feb. 22, 2022

(54) FRICTION ADAPTIVE VEHICLE CONTROL

(71) Applicant: Mitsubishi Electric Research Laboratories, Inc., Cambridge, MA (US)

(72) Inventors: Karl Berntorp, Skanor SKA (SE); Rien Quirynen, Boston, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 187 days.

(21) Appl. No.: 16/299,285

(22) Filed: Mar. 12, 2019

(65) Prior Publication Data

US 2020/0290625 A1    Sep. 17, 2020

(51) Int. Cl.
*B60W 40/068* (2012.01)
*B60W 30/18* (2012.01)
*B60W 30/02* (2012.01)

(52) U.S. Cl.
CPC .......... *B60W 40/068* (2013.01); *B60W 30/02* (2013.01); *B60W 30/18172* (2013.01); *B60W 2520/26* (2013.01); *B60W 2552/40* (2020.02)

(58) Field of Classification Search
CPC ............... B60W 40/068; B60W 30/02; B60W 30/18172; B60W 2552/40; B60W 2520/26; B60W 40/064; B60W 40/00; B60W 30/00; B60W 2720/26; B60W 40/101; B60W 2520/266; B60W 2510/222; B60W 2710/223; B60W 40/12;
(Continued)

(56) References Cited

U.S. PATENT DOCUMENTS 9,751,533 B2 * 9/2017 Singh ...................... B60C 23/20
2003/0051544 A1   3/2003 Hong
(Continued)

FOREIGN PATENT DOCUMENTS

JP        4285124 B2 *  6/2009  .............. B60T 8/172

OTHER PUBLICATIONS

Steve Burion et al., "Identifying physical properties of deformable objects by using particle filters", IEEE, Jun. 13, 2008 (Year: 2008).*
(Continued)

*Primary Examiner* — Anne Marie Antonucci
(74) *Attorney, Agent, or Firm* — Gennadiy Vinokur; Hironori Tsukamoto

(57) ABSTRACT

A system control a vehicle using a friction function describing a friction between a type of surface of the road and a tire of the vehicle as a function of a slip of a wheel of the vehicle. The parameters of each friction function include an initial slope of the friction function defining a stiffness of the tire and one or combination of a peak friction, a shape factor and a curvature factor of the friction function. Upon estimating a slip and a stiffness of the tire, the system selects from the memory parameters of the friction function corresponding to the current stiffness of the tire, determines a control command using a value of the friction corresponding to the slip of the tire according to the friction function defined by the selected parameters, and submits the control command to an actuator of the vehicle.

20 Claims, 30 Drawing Sheets

(58) Field of Classification Search
CPC .............. B60W 40/06–068; B60T 8/00; B60T 2210/10; B60T 2210/12
See application file for complete search history.

(56) References Cited

U.S. PATENT DOCUMENTS

| | | | | |
|---|---|---|---|---|
| 2012/0179327 | A1* | 7/2012 | Yngve | B60W 40/064 |
| | | | | 701/32.9 |
| 2016/0368503 | A1* | 12/2016 | Jonasson | B60W 40/064 |
| 2018/0015931 | A1* | 1/2018 | Berntorp | B60T 8/172 |
| 2018/0319404 | A1* | 11/2018 | Jonasson | B60W 40/12 |
| 2019/0118822 | A1* | 4/2019 | Hagenlocher | B60W 40/068 |
| 2019/0256103 | A1* | 8/2019 | Capua | B60W 40/103 |
| 2019/0263392 | A1* | 8/2019 | Imamura | B60K 28/165 |

OTHER PUBLICATIONS

Wenbo Chu et al., "Vehicle State Estimation for In-Wheel Motor Electric Vehicle Using Unscented Particle Filter", Jul. 2012 (Year: 2012).*
Melda Ulusoy, "Understanding Kalman Filters, Part 3: An Optimal State Estimator", Mar. 27, 2017, MathWorks (Year: 2017).*
Qingjia Cui et al., "Path-tracking of an autonomous vehicle via model predictive control and nonlinear filtering", Oct. 4, 2017, Proceedings of the Institution of Mechanical Engineers, Part D: Journal of Automobile Engineering (Year: 2017).*
Wang et al., "Friction Estimation on Highway Vehicles Using Longitudinal Measurements", 2004, Journal of Dynamic Systems Measurement and Control (Year: 2004).*

* cited by examiner

| Surface | Linear parameters | Non-Linear parameters | | |
|---|---|---|---|---|
| | Stiffness | Peak | Shape | Curve |
| Asphalt | 10.64 | 0.961 | 1.19 | -1.11 |
| Snow | 7.41 | 0.394 | 0.550 | -1.93 |
| Ice | 4.33 | 0.167 | 1.48 | -1.08 |

FIG. 1E

| Surface | Linear parameters | Non-Linear parameters | | |
|---|---|---|---|---|
| | Stiffness | Peak | Shape | Curve |
| Asphalt | 9.86 | 0.935 | 1.19 | -1.21 |
| Snow | 6.8 | 0.383 | 0.550 | -2.10 |
| Ice | 4.02 | 0.162 | 1.48 | -1.18 |

FIG. 1D

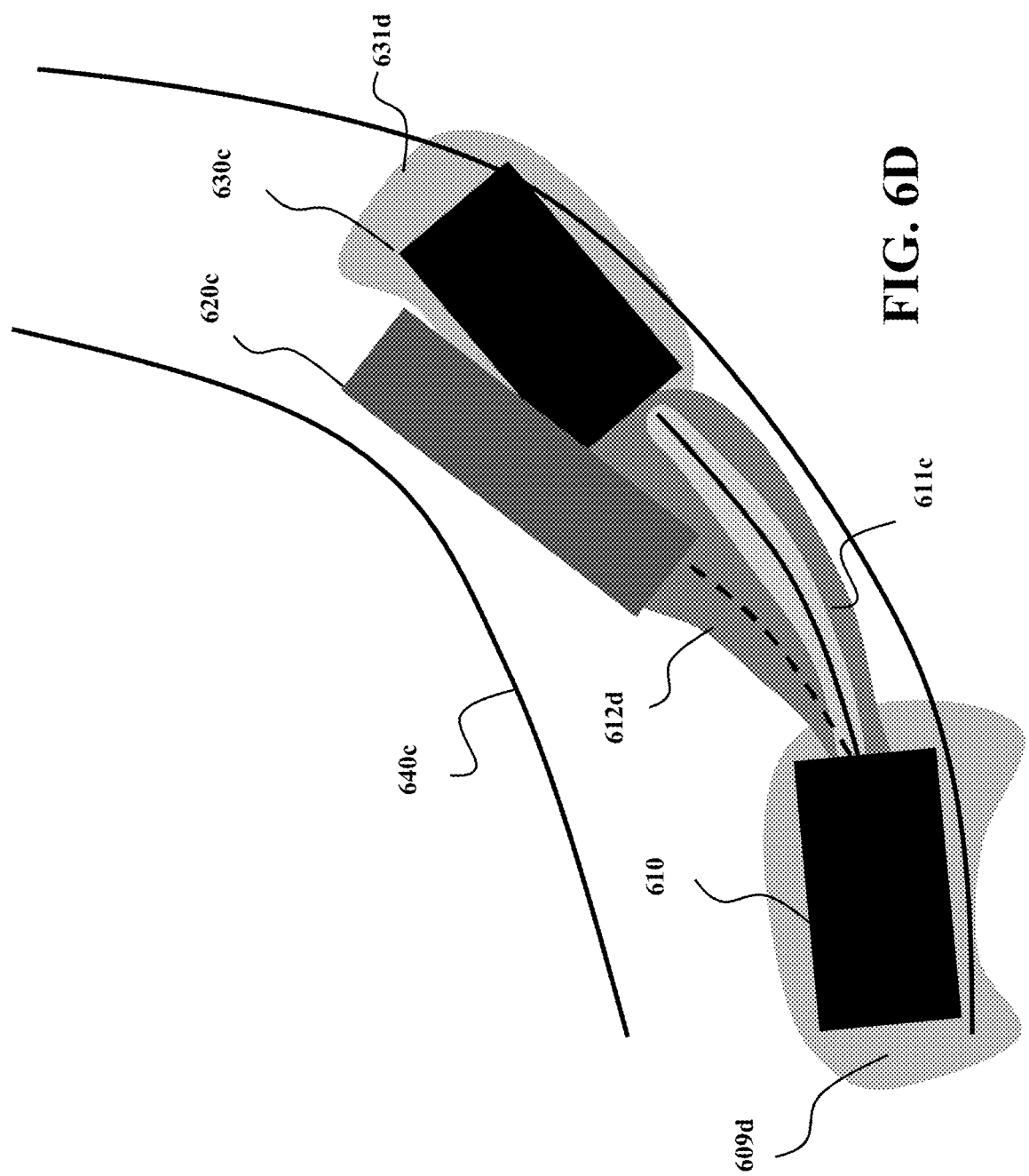

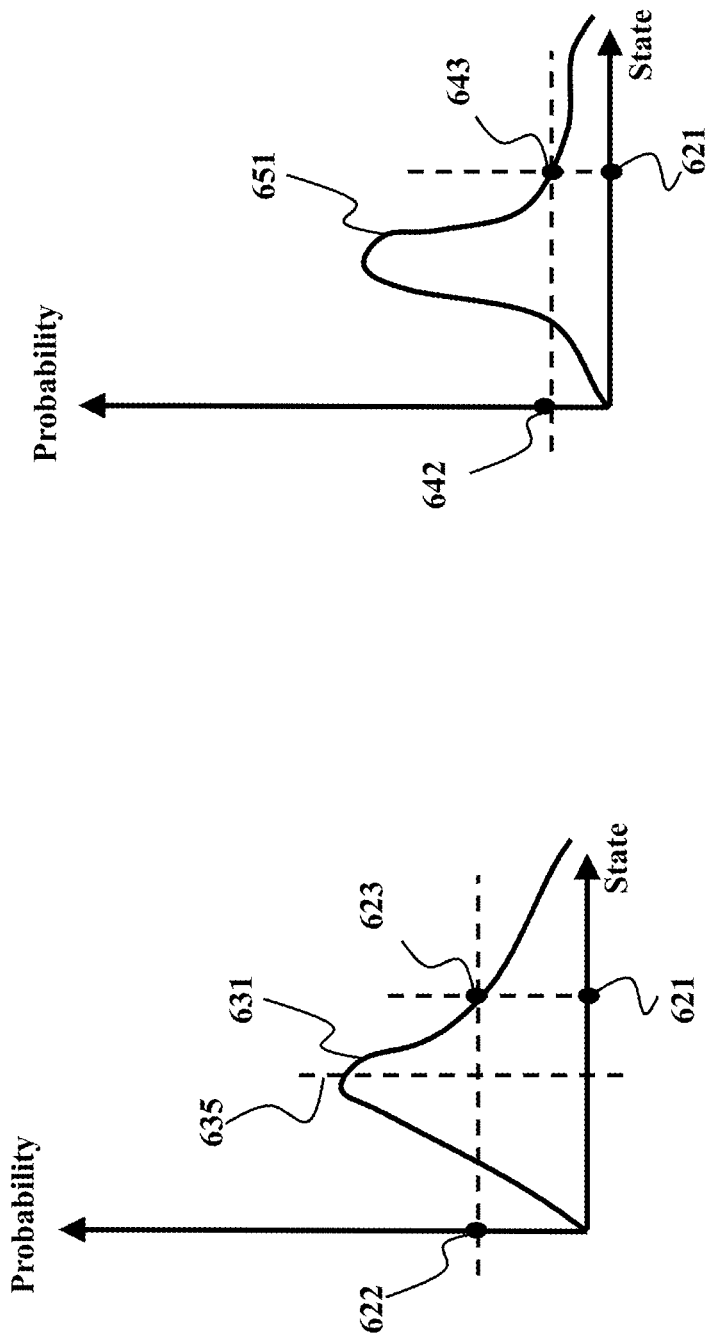

FRICTION ADAPTIVE VEHICLE CONTROL

TECHNICAL FIELD

The invention relates generally to vehicle control, and more particularly to methods and apparatus for adapting control of a vehicle in response to a change of tire friction acting on wheels of the vehicle.

BACKGROUND

Optimization based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, satellites, and power generators.

The MPC is based on a real time finite horizon optimization of a model of a system. The MPC has the ability to anticipate future events, and to take appropriate control actions. This is achieved by optimizing the operation of the system over a future finite time-horizon subject to constraints, and only implementing the control over a current time step.

The MPC can predict the change in state variables of the modeled system caused by changes in control variables. The state variables define a state of the system, i.e., a state of a controlled system is a smallest set of state variables in state-space representation of the control system that can represent the entire state of the system at any given time. For example, if a controlled system is an autonomous vehicle, the state variables may include position, velocity and heading of the vehicle. The MPC uses models of the system, the current system measurements and/or state estimates, current state of the vehicle, and state and control constraints to calculate future changes in the state of the vehicle. These changes are calculated to hold the state close to the target subject to constraints on both control and state variables. The MPC typically sends out only the first change in each control variable to be implemented, and repeats the calculation when the next change is required.

Many active safety systems in modern vehicles use knowledge of variables related to tire friction indicative of the vehicle's tire-to-road interaction. For example, anti-lock braking systems (ABS), electronic stability control systems (ECS), and advanced driver-assistance systems (ADAS), all make extensible use of the tire-to-road interaction, in order to provide advanced safety mechanisms.

There is a need to extend the usage of the tire friction for real time generating or changing the motion of a wheeled vehicle. However, the tire friction is challenging to measure during the actual real-time control of a vehicle using sensors available in production vehicles.

The tire friction depends on the force applied to the wheels of the vehicle. For example, applied force can be a steering torque or a braking torque, which transforms to a force by the arm lever. In theory, if the force is known, the tire-fore relationship can indicate the tire friction. However, the tire-force relationship is highly nonlinear and depends on various quantities, such as surface of a road, e.g., gravel or asphalt, the dampness and evenness of the surface, tire pressure, vehicle mass, tire temperature, and wear on the tire. It is difficult to estimate tire-force relationship in real time, i.e., during a control of a vehicle, since automotive-grade sensors are error prone and subject to large noise and considerable time varying biases. In addition, force sensors are very costly and direct estimation using these force sensors are hence not a viable choice for production vehicles where the costs are to be kept to a minimum.

Accordingly, there is a need to determine and use tire friction for real time control of a movement of a vehicle. There is also a need for adaptive control of a vehicle that can react to a change of tire friction acting on wheels of the vehicle. There is also a need to avoid or at least minimize the usage of expansive force sensors for adaptive friction control. There is also a need to control or to assist the control of the vehicle during normal and/or aggressive movements of the vehicle.

SUMMARY

It is an object of some embodiments to provide a system and a method for controlling the motion of the vehicle under varying road conditions. It is another object of some embodiments to provide such a method that considers tire friction in real time during the operation of the vehicle, such that the controlling of the motion of the vehicle can adapt to the changing road conditions. It is another object of some embodiments to provide such a method that considers the tire friction without sensing the friction between the wheels of the vehicle and the road that vehicle is traveling on. As used herein, a vehicle can be any type of wheeled vehicle, such as a passenger car, bus, or rover.

Additionally, or alternatively, it is an object of one embodiment to adapt friction considerations for model predictive control (MPC) consideration estimating of the friction over a prediction horizon.

The tire friction depends on the force applied to the wheels of the vehicle. Examples of applied force include a steering torque or a braking torque, which transforms to a force by the arm lever. For example, one factor relating to the forces generated by the tire-to-road contact is the slip. In a longitudinal case, i.e., in the wheel's forward direction, the slip is defined in terms of the difference of the longitudinal velocity and the rotational speed of the wheel normalized by either the rotational speed of the wheel or the longitudinal velocity, whichever one is greater, i.e., whether the wheel is accelerating or braking. In a lateral case, i.e., the wheel's lateral direction, the slip is defined in terms of a ratio between the wheel's lateral and longitudinal velocity components.

A friction function defines the extent to which the tire resists deformation in response to an applied force. Specifically, a friction function describes a friction between a surface of the road and a tire of the vehicle as a function of slippage of a wheel of the vehicle. The current friction acting on the vehicle is difficult to measure. To that end, it is an object of some embodiments to control the motion of the vehicle using the knowledge of the friction function with or without the need to measure the actual friction at each instance of time. It is another object of some embodiments to control the motion of the vehicle during normal and aggressive driving of the vehicle using the knowledge of the friction function.

For example, during normal driving, in which case the slip is small, the friction function includes an initial slope defining a stiffness of the tire. As used herein, the normal driving is defined as regular driving, e.g., everyday driving in urban areas, where the vehicle avoids emergency braking and evasive steering maneuvers. The normal driving can be contrasted with aggressive driving when extensive force is applied on the wheels of the vehicle. As used herein, the aggressive driving is defined as driving where braking/acceleration and/or steering torque is large enough such that the vehicle operates close to the tire adhesion limits of material of the tires. For example, while the validity of the linear region of the tire force function varies between different surfaces, approximating the tire force function with a linear function is valid for accelerations up to roughly 4 m/s$^2$ on asphalt surfaces, i.e., approximately 40% of the total available force on asphalt. As an example, production-type electronic stability control systems measure a deviation from a predicted measurement, using a steering wheel angle and a longitudinal velocity, to a vehicle model using the tire force function as a linear approximation. When the deviation is more than a threshold, safety braking is activated. Thus, one exemplar measure of normal driving is driving well below these activation thresholds. In other words, if the driving is not aggressive, the driving is normal.

During the aggressive driving the wheel slips more, which causes a larger force/friction variation. This variation is highly non-linear. For example, regardless of the extent of the force and type of the road, there is a maximum friction for almost all surfaces, which occurs at a point from which the force decreases when applying more braking/steering torque. After this point the increase in wheel slip results in smaller tire forces. For large wheel slip beyond the maximum force it becomes more difficult to maintain a desired wheel slip, since the dynamics becomes unstable beyond the point of maximum force. Therefore, vehicles are often controlled such that the wheel slip stays small enough such that the peak is not exceeded.

Hence, the friction function includes a linear part roughly corresponding to normal driving and a non-linear part corresponding to aggressive driving. During the normal driving, the friction function changes slowly and predictably. In addition, usually, the vehicle is controlled with force consistent with the normal driving. Such a control is safer and gives time and sufficient data allowing learning the linear part of the friction function during the control of the vehicle and to use the learned part of the friction function for vehicle control. For example, some embodiments use a filter configured to determine the current state of the stiffness of the tire by comparing a current state of the vehicle estimated using the stiffness of the tire with measurements of the current state of the vehicle. In other words, it is possible and safe to learn linear part of the friction function in real time during the control of the vehicle.

In contrast, the aggressive driving changes the friction function rapidly and non-linearly. Hence, controlling the vehicle using values of the linear part of the friction function can jeopardize accuracy and safety of vehicle control. In addition, non-linear variations of the friction function during the aggressive driving and relatively short time when a vehicle is driven under a specific style of the aggressive driving make the learning of the non-linear part of the friction function impractical. Hence, there is still a need for a method that can rapidly estimate non-linear part of the friction function during a real-time control of the vehicle. To the best of our knowledge, this method does not exist so far. Hence, when the vehicle is driven aggressively, it is challenging to estimate the tire friction without using the specialized, but expensive and unreliable sensors.

Some embodiments are based on realization that a friction function is known, the control of the vehicle using the motion model can be performed in consideration of the friction of the tires of the wheels of the vehicle with the road the vehicles is traveling on even without measurement of the current friction. Indeed, regardless of the normal or aggressive driving, the current slip of the wheels can be determined using various techniques. For example, the current slip can be determined by fusing the information from several sensors, including a longitudinal acceleration sensor, a lateral acceleration sensor, a rotation-rate sensor, a steering-wheel sensor, and wheel-speed sensors. Hence, when friction function is known, a vehicle controller can use a value of the friction corresponding to the slip of the tire according to the friction function. In effect, knowing the friction function allows estimate the friction without the need to measure it.

Additionally, or alternatively, the measurements of the friction would produce only current estimates of the friction for current instance of time. It is an object of one embodiment to adapt friction considerations for model predictive control (MPC) consideration estimating of the friction over a prediction horizon.

Some embodiments are based on recognition that the slippage of the vehicle can be accurately predicted over the prediction horizon based on current state of the vehicle and, if available, a target state of the vehicle. When the friction function is known, the MPC can predict a variation of the friction over a prediction horizon based on prediction of a variation of the slip over the prediction horizon and determines the control command using the variation of the friction over the prediction horizon. In effect, the knowledge of the friction function increases the accuracy of MPC.

To that end, there is a need to estimate the friction function in real time during the operation of the vehicle. This is a challenging problem, because the tire-force relationship is highly nonlinear, depends on the surface of a road the vehicle is traveling, but and also depends on other quantities, such as tire pressure, vehicle mass, tire temperature, and wear on the tire.

Some embodiments are based on recognition that the friction function can be parameterized along its length. For example, the parameters of the friction function can define either linear part of the friction function, and referred herein as linear parameters, or define non-linear part of the friction function, and referred herein as non-linear parameters. The linear parameters of the road-to-tire interaction represent linear relationship between the tire friction/force (friction is force divided by mass) and the wheel slip. The physical interpretation is that the contact patch of the wheel deforms and slips in response to an applied wheel torque/force. Linear parameters include a value of an initial slope of the friction function defining a stiffness of the tire for each wheel. The tire stiffness is in general different in the forward and lateral direction, so there are in general two individual force-slip curves per wheel, possibly depending on each other. Additionally, or alternatively, the linear parameters can include a camber angle and an offset parameter.

Non-linear parameters include one or combination of a peak friction, a shape factor and a curvature factor of the friction function. For example, the peak friction factor determines the maximum available friction, i.e., the value of the friction curve at the wheel slip where the peak is obtained, the shape factor determines the shape of the nonlinear friction function, and the curvature factor determines the characteristic around the peak of the curve.

Some embodiments are based on realization that the motion model including friction function can be replaced with the motion model including linear and non-linear parameters of the friction function. Such a replacement simplifies computation of the friction function without impractically reducing the quality of estimation. However, there is still a need to determine parameters of the friction function in real time. While the linear parameters, such as stiffness, can be safely learned in real time during the operation of the vehicle, real time learning of the non-linear parameter is problematic.

Some embodiments based on discovery performed with a help of an exploratory data analysis (EDA), that there is a stable relationship or regularity between different parameters of the friction function. Specifically, for a particular type of a surface of a road, non-linear parameters of a friction function depend on the linear parameters of the friction function. The relationship allows to associate the non-linear parameters determined in advance, e.g., off-line, with linear parameters determined in real time.

For example, some embodiments determine and/or store in a memory parameters of multiple friction functions. Each friction function describes a friction between a specific type of surface of the road and a tire of the vehicle as a function of slippage of a wheel of the vehicle. Examples of different types of a surface include asphalt, such as dry asphalt or wet asphalt, snow, such as packed snow or loose snow, and ice. The parameters of each friction function include at least one linear parameter, such as an initial slope of the friction function defining a stiffness of the tire, and at least one non-linear parameter, such as one or combination of a peak friction, a shape factor and a curvature factor of the friction function.

Upon determining the stiffness of the tire, the embodiments select from the memory parameters of the friction function corresponding to a current state of the stiffness of the tire. Such a selection allows the embodiments to determine the tire friction for both normal and aggressive driving. For example, some embodiments determine a control command using a motion model of the vehicle including the parameters of the friction function, and submit the control command to an actuator of the vehicle to move the vehicle on the road. Such a model more accurately represents dynamics of the motion of a vehicle.

Some embodiments are based on recognition that friction function strongly depends on the surface of the road, but also depends on other quantities, such as tire pressure, vehicle mass, tire temperature, and wear on the tire. Some embodiments are based on recognition that it is possible to determine off-line parameters of the friction function not only for different surfaces, but also for the same surface in consideration of other quantities. For example, some embodiments determine the parameters of friction function for asphalt road and a specific type of a vehicle, e.g., a sedan or an SUV. However, determining and using parameters of all possible variations of friction function using different combination of those quantities can be computationally prohibitive.

Some embodiments are based on realization that the relationship between linear and non-linear parameters is probabilistic. This probabilistic relationship is mutual, but as a practical matter can be represented probabilistic distribution of a state of stiffness. For example, the mean of the probabilistic distribution models the stiffness variations based on the tire and surface type, such as asphalt or snow, and the variance models external disturbance due to either variations on a surface, such as road unevenness, patches of loose snow, road in mixed conditions and/or other variations of the quantities affecting the friction.

To that end, some embodiments use a probabilistic filter configured to determine a probabilistic distribution of the current state of the stiffness of the tire with a mean indicative of the type of the surface of the road and a variance indicative of uncertainty caused by external disturbances. Examples of the probabilistic filter include a Kalman-type filter with the mean and variance augmenting the state of the vehicle, a particle filter, or a Kalman-type filter with mean and variance deduced from a so-called variational Bayes procedure.

For example, one embodiment selects the friction function including the stiffness with the highest probability according to the probabilistic distribution of the current state of the stiffness above a threshold. Alternative embodiments, however, use the probabilistic distribution of the vehicle to increase safety of the vehicle control. These embodiments are based on understanding stemmed from various simulations and experiments, that when the variation of the state of stiffness can justify selection of different friction function, the friction function corresponding to more slippery surface, i.e., a lower friction surface, need to be selected. For example, if the current state of stiffness can correspond to asphalt road and to snowy road with different probability, some embodiments have a tendency to select the friction function corresponding to driving on a snowy road.

For example, one embodiment selects the friction function including the stiffness with a probability above a corresponding threshold, wherein different thresholds correspond to different friction functions. For example, a threshold corresponding to a friction function is inversely proportional to a value of the peak friction of the friction function, such that a first threshold for a first friction function having a first peak friction is less than a second threshold for a second friction function having a second peak friction when the second peak friction is larger than the first peak friction. In effect, such a selection can make the control less aggressive when the knowledge of the road conditions is more uncertain.

As another example, one embodiment selects the friction function including the stiffness by maximizing the likelihood between the stored memory and the estimated tire stiffness, i.e., to maximize the fit in consideration of the variance of the probabilistic distribution. Doing in such a manner takes into account the variation due to external disturbances, and is another way to ensure less aggressive control when the knowledge of the road conditions is uncertain.

Accordingly, one embodiment discloses a system for controlling a vehicle moving on a road, that includes an input interface configured to accept measurements indicative of a state of the vehicle; a memory configured to store parameters of multiple friction functions, each friction function describes a friction between a type of surface of the road and a tire of the vehicle as a function of a slip of a wheel of the vehicle, the parameters of each friction function include an initial slope of the friction function defining a stiffness of the tire and one or combination of a peak friction, a shape factor and a curvature factor of the friction function; and at least one processor programmed to execute elements of executable components of the system including: a signal conditioner configured to process the measurements to estimate a signal including the slip of the wheel of the vehicle; a stiffness estimator configured to estimate a current state of the stiffness of the tire of the wheel of the vehicle using one or combination of the signal estimated by the signal conditioner and the measurements accepted by the input interface; a parameter selector configured to select from the memory parameters of the friction function corresponding to the current stiffness of the tire; and a controller configured to determine a control command using a value of the friction corresponding to the slip of the tire according to the friction function defined by the selected parameters, and submit the control command to an actuator of the vehicle to move the vehicle on the road.

Another embodiment discloses a method for controlling a vehicle moving on a road, wherein the method uses a processor coupled to a memory storing parameters of multiple friction functions, each friction function describes a friction between a type of surface of the road and a tire of the vehicle as a function of a slip of a wheel of the vehicle, the parameters of each friction function include an initial slope of the friction function defining a stiffness of the tire and one or combination of a peak friction, a shape factor and a curvature factor of the friction function, wherein the processor is coupled with stored instructions implementing the method, wherein the instructions, when executed by the processor carry out steps of the method, including accepting measurements indicative of a state of the vehicle; processing the measurements to estimate a signal including the slip of the wheel of the vehicle; estimating a current state of the stiffness of the tire of the wheel of the vehicle using one or combination of the signal estimated by the signal conditioner and the measurements accepted by the input interface; selecting from the memory parameters of the friction function corresponding to the current stiffness of the tire; determining a control command using a value of the friction corresponding to the slip of the tire according to the friction function defined by the selected parameters; and submitting the control command to an actuator of the vehicle to move the vehicle on the road.

Yet another embodiment discloses a non-transitory computer readable storage medium embodied thereon a program executable by a processor for performing a method, wherein the medium is configured to store parameters of multiple friction functions, each friction function describes a friction between a type of surface of the road and a tire of the vehicle as a function of a slip of a wheel of the vehicle, the parameters of each friction function include an initial slope of the friction function defining a stiffness of the tire and one or combination of a peak friction, a shape factor and a curvature factor of the friction function. The method includes accepting measurements indicative of a state of the vehicle; processing the measurements to estimate a signal including the slip of the wheel of the vehicle; estimating a current state of the stiffness of the tire of the wheel of the vehicle using one or combination of the signal estimated by the signal conditioner and the measurements accepted by the input interface; selecting from the memory parameters of the friction function corresponding to the current stiffness of the tire; determining a control command using a value of the friction corresponding to the slip of the tire according to the friction function defined by the selected parameters; and submitting the control command to an actuator of the vehicle to move the vehicle on the road.

BRIEF DESCRIPTION OF THE DRAWINGS

FIGS. 1D and 1E show tabulated values of different functions determined for different types of the road and for different types of a vehicle and tire combination, obtained using summer tires and a medium-size passenger vehicle.

FIG. 6D shows the motion of the vehicle according to some embodiments.

FIG. 6E shows a graph illustrating selection of the probability of the sampled parameters using the PDF over possible states of the vehicle according to one embodiment.

FIG. 6F shows another graph illustrating selection of the probability of the sampled parameters according to PDF different from the PDF of FIG. 6E.

DETAILED DESCRIPTION

Figure 1A:
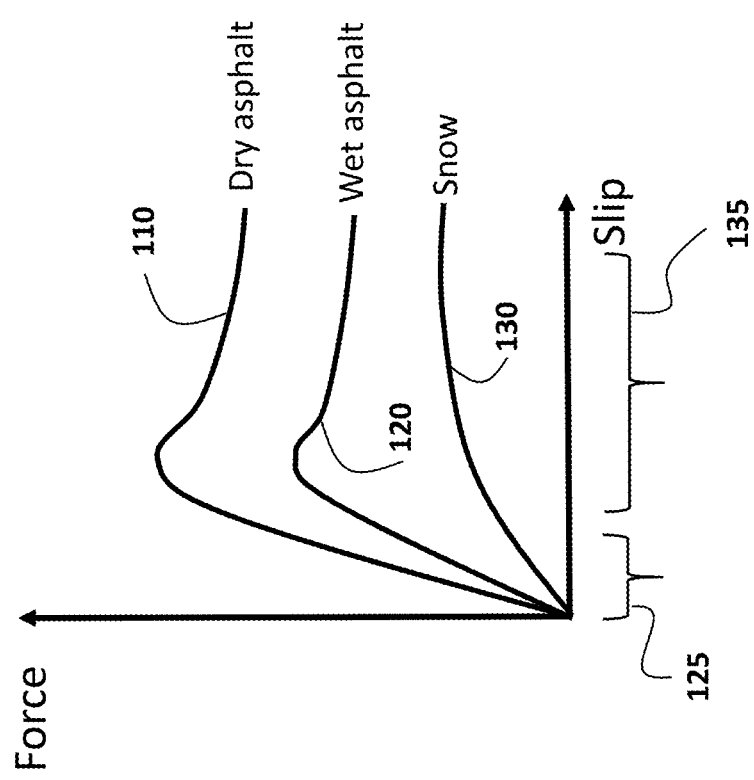
FIG. 1A shows a schematic of different friction functions used by some embodiments to control the motion of a vehicle.

FIG. 1A shows a schematic of different friction functions used by some embodiments to control the motion of a vehicle. The friction functions illustrate how the magnitude of the force on a tire of vehicle traveled on a road varies with the slip for different types of the surface of the road such as dry asphalt 110, wet asphalt 120, and snow 130 surfaces. The tire-force relationship is highly nonlinear and also depends on other quantities, such as tire pressure, vehicle mass, tire temperature, and wear on the tire. As used herein, a vehicle can be any type of wheeled vehicle, such as a passenger car, bus, or rover.

FIG. 1A shows an exemplar situation when all other quantities except the slip are kept fixed. This is a per se method of illustrating the tire-force relationship. FIG. 1A can illustrate the longitudinal force, in which case the slip is defined in terms of the difference of the longitudinal velocity and the rotational speed of the wheel normalized by either the rotational speed of the wheel or the longitudinal velocity, whichever one is greater. FIG. 1A can illustrate the lateral force, in which case the slip is defined in terms of a ratio between the wheel's lateral and longitudinal velocity components.

During normal driving 125, in which case the slip is small, the friction function includes an initial slope defining a stiffness of the tire. As used herein, the normal driving is defined as regular driving, e.g., everyday driving in urban areas, where the vehicle avoids emergency braking and evasive steering maneuvers. The normal driving can be contrasted with aggressive driving when extensive force is applied on the wheels of the vehicle. As used herein, the aggressive driving is defined as driving where braking/acceleration and/or steering torque is large enough such that the vehicle operates close to the tire adhesion limits of material of the tires. For example, while the validity of the linear region of the tire force function varies between different surfaces, approximating the tire force function with a linear function is valid for accelerations up to roughly 4 m/s$^2$ on asphalt surfaces, i.e., approximately 40% of the total available force on asphalt. As an example, production-type electronic stability control systems (ESC) measure a deviation from a predicted measurement, using a steering wheel angle and a longitudinal velocity, to a vehicle model using the tire force function as a linear approximation. When the deviation is more than a threshold, safety braking is activated. Thus, a measure of normal driving is driving well below these activation thresholds. In other words, if the driving is not aggressive, the driving is normal.

During the aggressive driving 135 the wheel slips more, which causes a larger force/friction variation. This variation is highly non-linear. For example, regardless of the extent of the force and type of the road, there is a maximum friction for almost all surfaces, which occurs at a point from which the force decreases when applying more braking/steering torque. After this point the increase in wheel slip results in smaller tire forces. For large wheel slip beyond the maximum force it becomes more difficult to maintain a desired wheel slip, since the dynamics becomes unstable beyond the point of maximum force. Therefore, vehicles are often controlled such that the wheel slip stays small enough such that the peak is not exceeded.

Hence, the friction function includes a linear part roughly corresponding to normal driving and a non-linear part corresponding to aggressive driving. During the normal driving, the friction function changes slowly and predictably. In addition, usually, the vehicle is controlled with force consistent with the normal driving. Such a control is safer and gives time and sufficient data allowing learning the linear part of the friction function during the control of the vehicle and to use the learned part of the friction function for vehicle control. For example, some embodiments use a filter configured to determine the current state of the stiffness of the tire by comparing a current state of the vehicle estimated using the stiffness of the tire with measurements of the current state of the vehicle. In other words, it is possible and safe to learn linear part of the friction function in real time during the control of the vehicle.

In contrast, the aggressive driving changes the friction function rapidly and non-linearly. Hence, controlling the vehicle using values of the linear part of the friction function can jeopardize accuracy and safety of vehicle control. In addition, non-linear variations of the friction function during the aggressive driving and relatively short time when a vehicle is driven under a specific style of the aggressive driving make the learning of the non-linear part of the friction function impractical. Hence, there is still a need for a method that can rapidly estimate non-linear part of the friction function during a real-time control of the vehicle. To the best of our knowledge, this method does not exist so far.

Figure 1B:
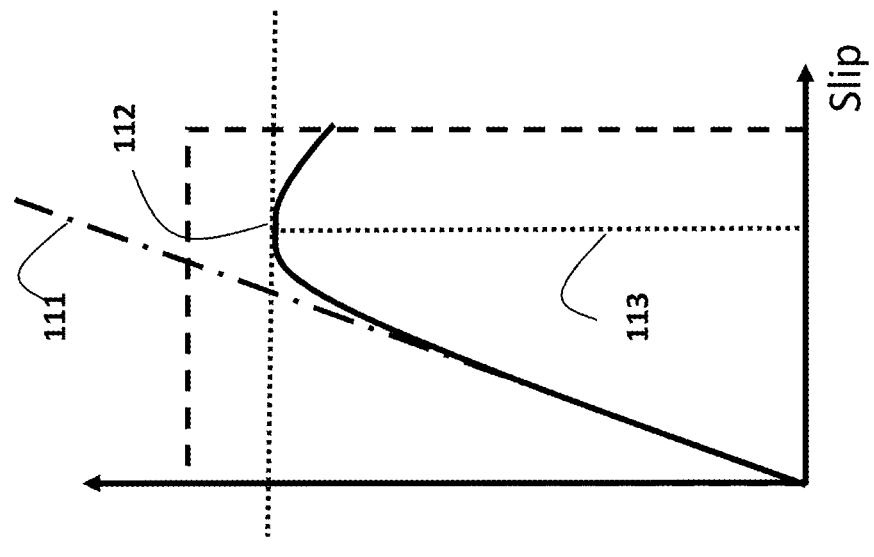
FIG. 1B shows a zoomed-in version of FIG. 1A, where the force has been normalized with the normal force resting on the wheel, where the case of dry asphalt is considered in more detail.
Figure 1B:
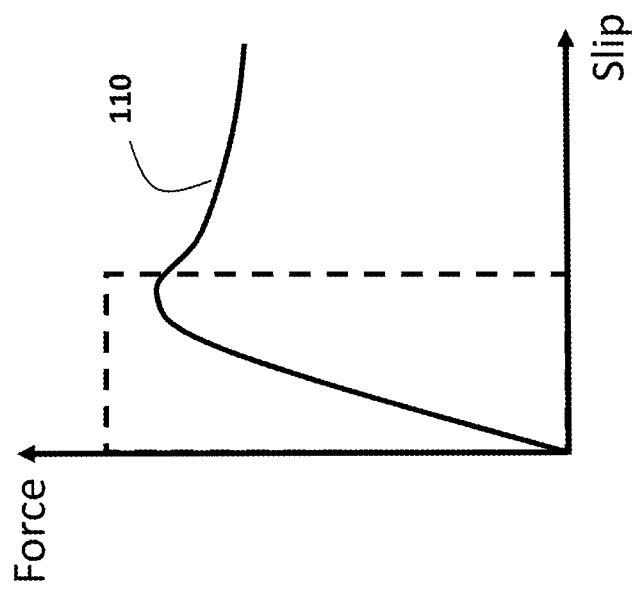

FIG. 1B shows a zoomed-in version of FIG. 1A, where the force has been normalized with the normal force resting on the wheel, where the case of dry asphalt 110 is considered in more detail. The value where the force attains its maximum is called the peak friction 112. The peak friction 112 corresponds to aggressive driving and is useful to know in several automotive control systems. For example, the knowledge of peak friction is useful in order to know how much brake torque that can be applied to a particular wheel in ESCs. The peak friction value and the corresponding slip value 113 can be used in anti-lock braking systems (ABS) to achieve optimal braking force. The initial slope 111 of the force curve 110 is usually called the stiffness of the tire. During normal driving 125, in which case the slip is small, the force curve can be approximated with the tire stiffness 111. However, during the aggressive driving 135, the stiffness is not a good approximation of the force curve.

The stiffness 111 is useful in vehicle control, for example, in ESC and active front steering (AFS) systems. However, the stiffness 111 can define multiple parameters. For example, the stiffness 111 can also be used to determine the peak friction 112, since the tire stiffness is dependent on the peak friction, and vice versa. For example, from FIG. 1A, by comparing the force curves for dry asphalt 110, wet asphalt 120, and snow 130, that the peak friction value is large whenever the tire stiffness value is large. To that end, some embodiments determine a state of stiffness of tires of the vehicle, wherein the state of stiffness includes at least one parameter defining an interaction of at least one tire of the vehicle with a road on which the vehicle is traveling. Examples of the parameter of the state of stiffness includes one or combination of a longitudinal stiffness of the tire, a lateral stiffness of the tire, a friction between the tire and the road.

The stiffness is useful parameter for describing the tire to road interaction, i.e., the tire friction function, during normal driving, but it is insufficient to fully capture the nonlinear behavior of the tire to road interaction when aggressive driving, such as large steering and/or acceleration, is performed. However, the estimated stiffness during normal driving can still be used to determine properties of the nonlinear parts of the tire friction function.

Some embodiments are based on recognition that the friction function can be parameterized along its length. For example, one way to model the tire force relation is through the Magic formula, or Pacejka model, given by $$F_0(m)=D \sin(C \arctan(Bm-E(Bm-\arctan(Bm)))), \quad (1)$$

where B is the stiffness factor, c is the shape factor, D is the peak factor, corresponding to the peak friction coefficient, E is the curvature factor, $F_0$ is either the longitudinal force or lateral force, and m is either the longitudinal slip or the lateral slip. Equation (1) is highly nonlinear and depends on parameters defining linear and non-linear parts of the friction function.

Figure 1C:
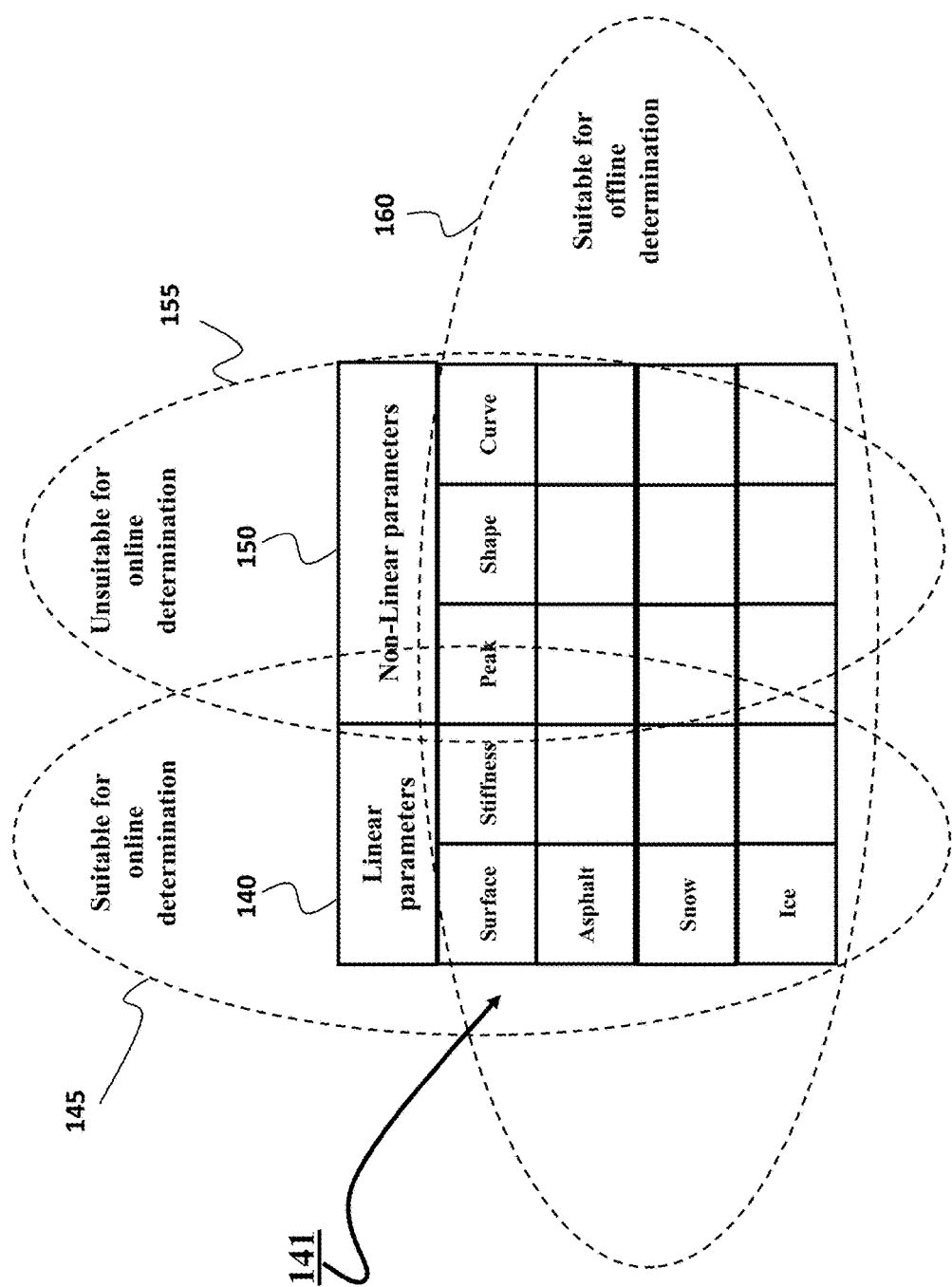
FIG. 1C shows a table with different types of parameters defining the friction function used by some embodiments.

FIG. 1C shows a table 141 with different types of parameters defining the friction function used by some embodiments. The parameters of the friction function can define either linear part of the friction function, and referred herein as linear parameters 140, or define non-linear part of the friction function, and referred herein as non-linear parameters 150. The linear parameters 140 of the road-to-tire interaction represent linear relationship between the tire friction/force (friction is force divided by mass) and the wheel slip. The physical interpretation is that the contact patch of the wheel deforms and slips in response to an applied wheel torque/force. Linear parameters include a value of an initial slope of the friction function defining a stiffness of the tire for each wheel. The tire stiffness is in general different in the forward and lateral direction, so there are in general two individual force-slip curves per wheel, possibly depending on each other. FIG. 1C shows only stiffness as a linear parameter. Additionally, or alternatively, the linear parameters can include a camber angle and an offset parameter.

Some embodiments are based on realization that if a motion model describing dynamics of a controlled vehicle includes a friction function, the control of the vehicle using the motion model can be performed in consideration of the friction of the tires of the wheels of the vehicle with the road the vehicles is traveling on even without determination and/or measurement of the current friction. The motion model estimates a state of the vehicle, such as a position and a heading of the vehicle. In addition, the state can be measured by sensors other than an expensive force and/or friction sensors. Examples of measurements of the state of the vehicle that depend on the state of the stiffness include a longitudinal velocity, a lateral velocity, and a rotation rate of the vehicle. In some situations, such a state of the vehicle can be directly measured or can be determined by fusing the information from several sensors, including a longitudinal acceleration sensor, a lateral acceleration sensor, a rotation-rate sensor, a steering-wheel sensor, and wheel-speed sensors.

When the motion model includes the friction function, the state is determined in consideration of the friction and verified with the measurements other than the measurements of the current tire friction. In other words, if the friction function is part of the motion model, the joint usage of the motion and measurement models have an effect of knowing the current friction for both normal and aggressive driving.

Hence, if the friction function is unknown, the measurement of the friction corresponding to aggressive driving can be avoided.

To that end, there is a need to estimate the friction function in real time during the operation of the vehicle. This is a challenging problem, because the tire-force relationship is highly nonlinear, depends on the surface of a road the vehicle is traveling, but and also depends on other quantities, such as tire pressure, vehicle mass, tire temperature, and wear on the tire.

Some embodiments are based on realization that the motion model including friction function can be replaced with the motion model including linear and non-linear parameters of the friction function, e.g., as in Equation (1). However, different embodiments use different parameterization of the friction function with different combinations of linear and non-linear parameters. Such a replacement simplifies computation of the friction function without impractically reducing the quality of estimation. However, there is still a need to determine parameters of the friction function in real time. While the linear parameters, such as stiffness, can be safely learned 145 in real time during the operation of the vehicle, real time learning 155 of the non-linear parameter is problematic.

Some embodiments are based on recognition that the linear and non-linear parameters for different types of surface can be learned offline 160. For example, the parameters can be learned using a test rig with specialized force sensors. In addition, some embodiments based on discovery performed with a help of an exploratory data analysis (EDA), that there is a stable relationship or regularity between different parameters of the friction function. Specifically, for a particular type of a surface of a road, non-linear parameters of a friction function depend on the linear parameters of the friction function. The relationship allows to associate the non-linear parameters determined in advance, e.g., off-line, with linear parameters determined in real time.

To that end, some embodiments determine and/or store in a memory parameters of multiple friction functions, e.g., in a tabulated format 141. Each friction function describes a friction between a specific type of surface of the road and a tire of the vehicle as a function of slippage of a wheel of the vehicle. Examples of different types of a surface include asphalt, such as dry asphalt or wet asphalt, snow, such as packed snow or loose snow, and ice. Referring to FIG. 1C, the parameters of each friction function include at least one linear parameter, such as an initial slope of the friction function defining a stiffness of the tire, and at least one non-linear parameter, such as one or combination of a peak friction, a shape factor and a curvature factor of the friction function.

FIGS. 1D and 1E show tabulated values of different functions determined for different types of the road and for different types of a vehicle and tire combination, obtained using summer tires and a medium-size passenger vehicle. The peak determines the maximum value of the tire friction function, and is decreasing the grip between the tire and road. The shape factor determines the shape of the curve, the curvature factor determines the shape of the curve around the peak, and the stiffness factor is the initial slope of the tire friction function. For instance, a large stiffness indicates a sharply increasing force for small slip values.

In various embodiments, the values of different functions are determined for a variety of different types of the road, including, but not limited to wet asphalt, dry asphalt, loose snow, packed snow, and gravel. In some embodiments, the values of different functions are determined for the same type of the surface to reflect the uncertainty of friction selection. In some embodiments, the values of different functions are determined for different types of the vehicles, and/or tires. In some implementations, the embodiments include a user interface allowing to select the desired types of the surfaces, vehicles and tires.

During the operation of the vehicle, the stiffness of the tire determined online can be compared with the stiffness of the tire determined offline and the parameters of the friction function with the corresponding, e.g., the closest matching stiffness can be added to the motion model to control a vehicle. In effect, such online/offline selection of the parameters of the friction function allows to control the vehicle during normal and aggressive driving using online determination of the stiffness during the normal driving, but without the need for measuring current friction coefficient for both the normal and the aggressive driving.

Figure 2A:
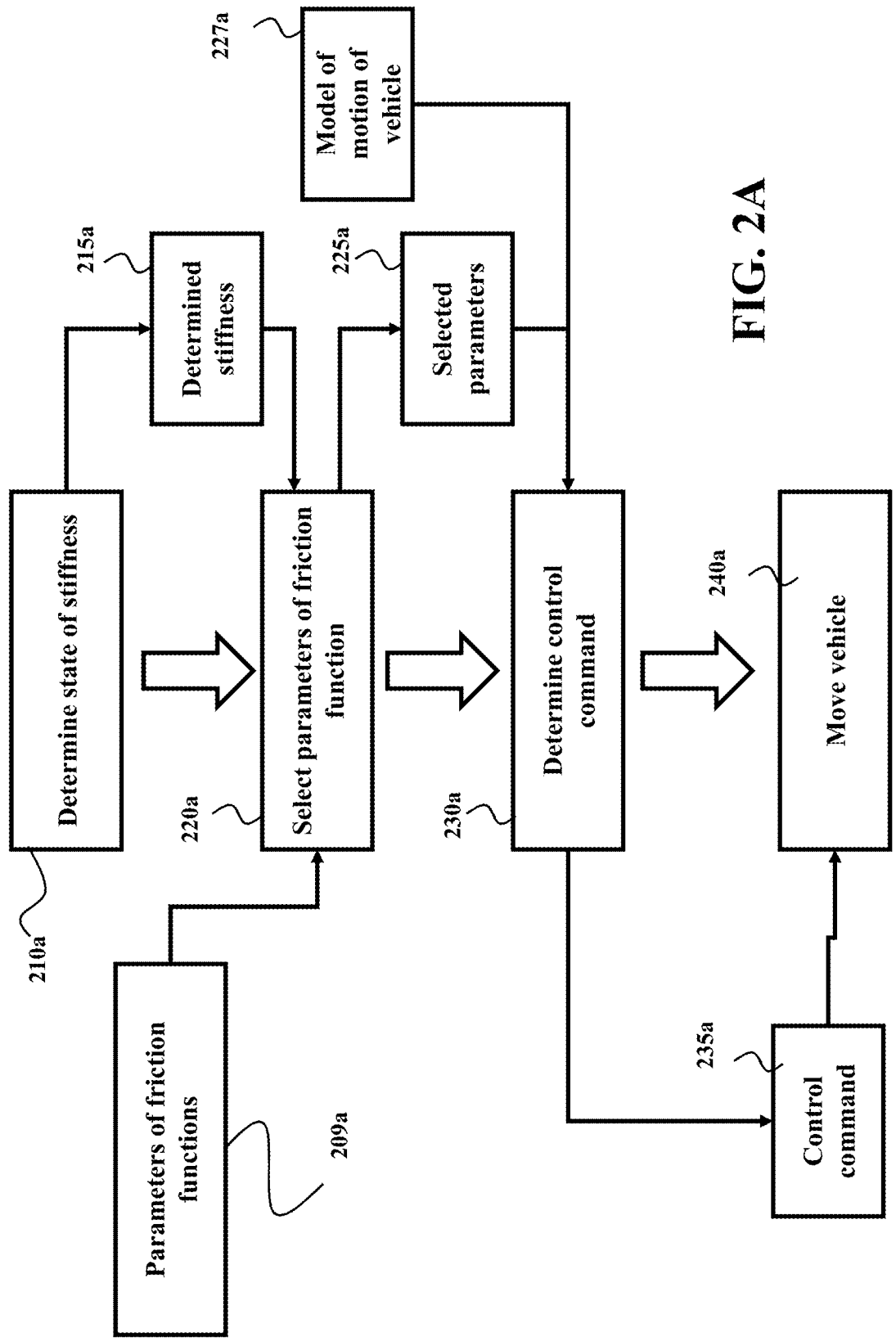
FIG. 2A shows a block diagram of one iteration of a method for controlling a vehicle moving on a road according to one embodiment.

FIG. 2A shows a block diagram of one iteration of a method for controlling a vehicle moving on a road, e.g., controlling the vehicle according to a reference trajectory of desired vehicle positions and velocities along the road according to one embodiment. This embodiment is based on the recognition that the stiffness determined for normal driving can be used to select from a memory one of the multiple parameters of friction functions. The method can be implemented using a processor of the vehicle.

The method determines 210a a current state of stiffness 215a of at least one tire of the vehicle and accesses parameters 209a of multiple friction functions stored in a memory. Each friction function describing a friction between a type of surface of the road and a tire of the vehicle as a function of slippage of the vehicle, the parameters of each friction function include an initial slope of the friction function defining a stiffness of the tire and one or combination of a peak friction, a shape factor and a curvature factor of the friction function. Examples of parameters 209 are tabulated parameters of FIGS. 1D-1E.

Next, using the determined stiffness 215a, the method selects 220a a set of parameters 225a corresponding to a particular friction function. Using a model of motion of the vehicle 227a including the selected parameters 225a, the method determines 230a a control command 235a, and submit the control command 235a to an actuator of the vehicle to move the vehicle 240a on the road.

Figure 2B:
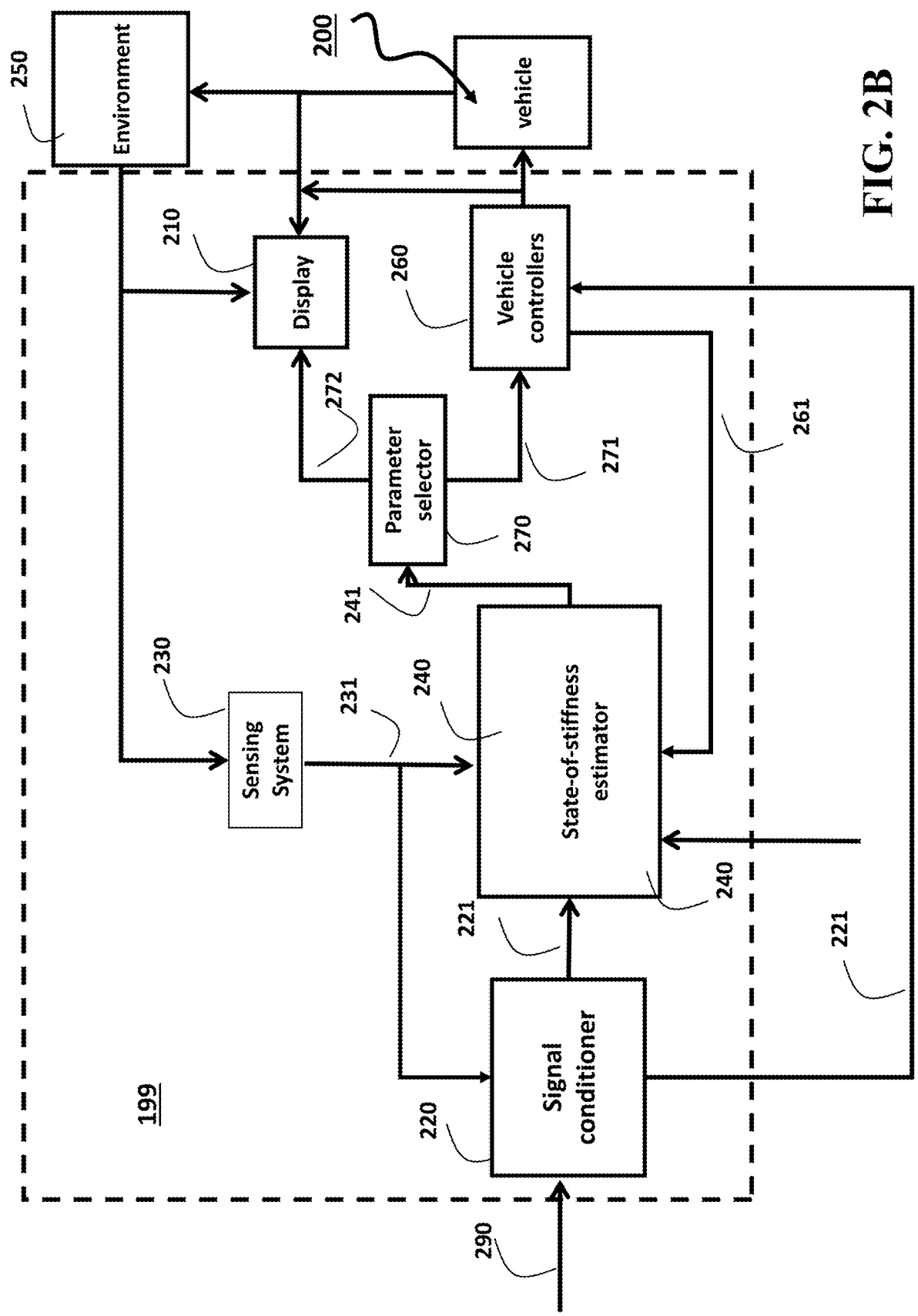
FIG. 2B illustrates a general block diagram of a control system for controlling a vehicle moving on a road and interacting with the environment according to some embodiments.

FIG. 2B illustrates a general block diagram of a control system 199 for controlling a vehicle 200 moving on a road and interacting with the environment 250 according to some embodiments. Different component of the control system 199 can be implemented using one or several processors operatively connected to a memory and/or various types of sensors of the vehicle. As used herein, a vehicle can mean any wheeled vehicle, including a passenger car, a bus, or a mobile robot. The vehicle can be an autonomous vehicle, semi-autonomous vehicle, or a standard vehicle equipped with active safety systems such as electronic stability control (ESC) and/or ABS. The control system 199 can be internal to the vehicle 200 and the implementation of the different components of the control system 199 can depend on the type of the vehicle. For example, depending on the type of the vehicle, the controllers 260 that generate the control commands to actuators of the vehicle 260 can vary.

The control system 199 includes a signal conditioner 220 that receives information 290 and produces estimates of the wheel speed for some or all wheels 221. The information 290 can include wheel-speed measurements from ABS, engine torque and rotation speed, and/or brake pressure. The control system 199 can also include a sensing system 230 that measures inertial components of the vehicle, such as rotation rate of the vehicle and acceleration of the vehicle, using an inertial measurement unit (IMU). For example, the IMU can comprise 3-axis accelerometer(s), 3-axis gyroscope(s), and/or magnetometer(s). The IMU can provide velocity, orientation, and/or other position related information to other components of the control system 199. The sensing system 230 can also receive global position information from a global positioning system (GPS) or equivalent.

The control system 199 also includes a state-of-stiffness estimator 240 for determining parameters of the state of the stiffness. In some embodiments, the state-of-stiffness estimator includes a filter that iteratively determines the state of the vehicle and the state of stiffness, from a state of the vehicle and a state of stiffness determined during previous iterations. In some implementations, a state of the vehicle includes velocity and heading rate of the vehicle, but can also include a position, heading, and additional quantities related to the motion of the vehicle.

The state-of-stiffness estimator 240 uses information 231 from the sensing system and wheel-speed estimates 221 from the signal conditioner 220. If the sensing system 230 is equipped with an IMU for measuring the longitudinal acceleration of the vehicle, the measurements from the IMU can be used to determine parameters related to the longitudinal friction of the tire. However, if the sensing system 230 does not possess information about longitudinal acceleration, the signal conditioner 220 can output an estimate 221 of the longitudinal acceleration based on the wheel-speed estimates and other quantities according to other embodiments. Additionally, or alternatively, the state-of-stiffness estimator 240 can determine an estimate of the longitudinal acceleration based on the wheel-speed information 221.

In one embodiment, the states of the vehicle and parameters determining the tire to road interaction are estimated iteratively by combining wheel-speed and IMU information. In another embodiment, the friction-estimation system only includes lateral components. In such a case, the information 221 can include necessary information for the longitudinal motion. The state-of-stiffness estimator 240 can also receive information 261 about the vehicle motion from the vehicle-control units 260. The information can include a state of the vehicle, such as position, heading, velocity, and is received either from hardware or software, connected directly or remotely to the machine.

For example, the state-of-stiffness estimator can output state of stiffness 241 including friction values, tire-stiffness values, certainty levels of the tire stiffness, or combinations thereof. The control system 199 also includes a parameter selector 270 that uses the state of stiffness 241 to determine a set of parameters 271 describing a tire-friction function, where the parameters for multiple tire-friction functions are stored in a memory.

The control system 199 includes vehicle controllers 260 that use the selected parameters 271 to generate control commands to one or multiple actuators of the controlled vehicle. For example, in one embodiment, the parameters are used in a motion model of the vehicle to control the vehicle using a model predictive controller (MPC). The vehicle controllers 260 can include stand-alone components, such as ABS, ESC, or ADAS, or a combination of vehicle controllers that enable autonomous driving features. For example, the selected parameters can output 272 a friction coefficient corresponding to the parameters to be displayed on a display 210 of the vehicle as supervisory components to a driver of the vehicle.

Some embodiments are based on realization that when a friction function is known, the control of the vehicle using the motion model can be performed in consideration of the friction of the tires of the wheels of the vehicle with the road the vehicles is traveling on even without measurement of the current friction. Indeed, regardless of the normal or aggressive driving, the current slip of the wheels can be determined using various techniques. For example, the current slip can be determined by fusing the information from several sensors, including a longitudinal acceleration sensor, a lateral acceleration sensor, a rotation-rate sensor, a steering-wheel sensor, and wheel-speed sensors. Hence, when friction function is known, a vehicle controller can use a value of the friction corresponding to the slip of the tire according to the friction function. In effect, knowing the friction function allows to estimate the friction without the need to measure it.

Additionally, or alternatively, the measurements of the friction would produce only current estimates of the friction for current instance of time. It is an object of one embodiment to adapt friction considerations for model predictive control (MPC) consideration estimating of the friction over a prediction horizon.

Some embodiments are based on recognition that the slippage of the vehicle can be accurately predicted over the prediction horizon based on current state of the vehicle and, if available, a target state of the vehicle. When the friction function is known, the MPC can predict a variation of the friction over a prediction horizon based on prediction of a variation of the slip over the prediction horizon and determines the control command using the variation of the friction over the prediction horizon. In effect, the knowledge of the friction function increases the accuracy of MPC.

Figure 2C:
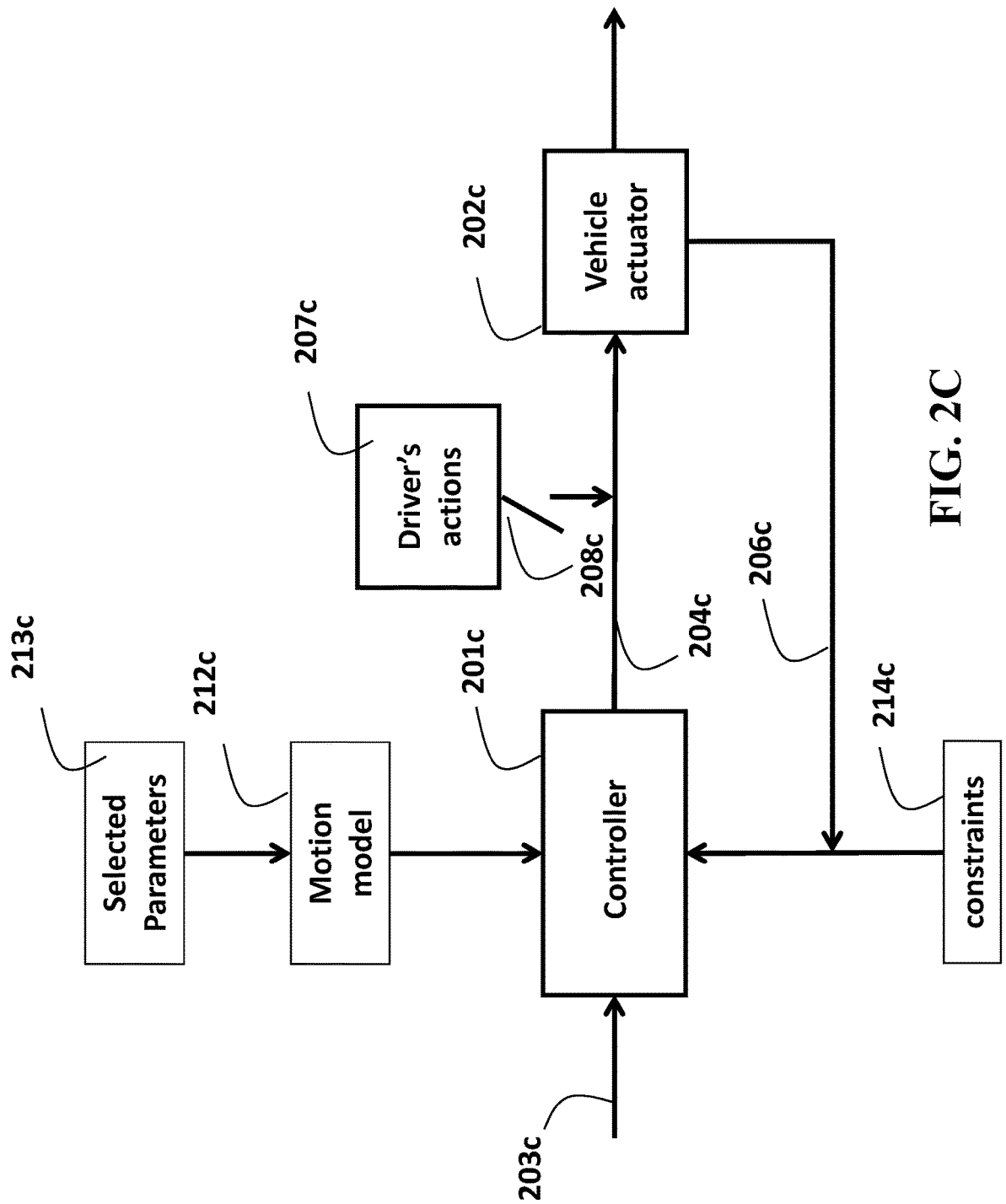
FIG. 2C shows a block diagram for how the selected parameters interact with various vehicle controllers according to some embodiments.

FIG. 2C shows a block diagram for how the selected parameters interact with various vehicle controllers according to some embodiments. The controller $210c$ is a model-based controller that uses a motion model $212c$ that includes parameters of friction function $213c$ to generate control command $204c$ to actuators $202c$ of the controlled vehicle. For instance, the controller can be a proportional-integral-derivative (PID) controller, or the controller $210c$ can be a model-predictive controller (MPC). The controller $210c$ can either be a stand-alone controller for autonomous driving or complementing actions of driver $207c$ for semi-autonomous driving. For instance, for autonomous driving the controller receives a reference trajectory $203c$, state and input constraints $214c$, and the motion model $212c$, and generates a desired steering angle $204c$ of the wheel to control the lateral motion, and/or a desired velocity or acceleration $204c$ to control the longitudinal motion of the vehicle. For semi-autonomous driving, the driver $207c$ turns the steering wheel to obtain a steering angle $208c$, possibly also with a longitudinal acceleration generated by the throttle/brake input. In such a case, the MPC can generate a correction of the driver's inputs to stabilize the vehicle in case of driving at-the-limits. In such a case, the inputs $206c$ from the actuators are used by the MPC.

One part of the motion model $212c$ includes the tire friction function parameterized by the selected parameters $213c$. Using tabulated parameters stored in memory gives the benefits of not needing to estimate in real time the current friction coefficient. Instead, according to the implementation, preconfigured parameters are utilized in the MPC, which results in that the tire friction can be determined by inserting the current slip value in the tire friction function defined by the preconfigured parameters.

In one embodiment, the controller $210c$ is a controller that uses only current value of the friction that corresponds to the current value of the slip according to current friction function. Examples of such a controller include a PID controller or an H-infinity controller, which uses a motion model including a tire friction function for designing the controller gains according to various control design methods. For such controllers, it is the static mapping of the slip to the friction that is of interest when designing the controller. Then, for the real-time control, the control command of the controller is determined by using a controller gain and a difference of the current vehicle state with a current measurement indicative of the vehicle state. Hence, some embodiments allow such controller to have a current friction value when determining the vehicle state to control the vehicle without measuring the value during both the normal and the aggressive driving.

In another embodiment, the controller $210c$ is an MPC. An MPC operates by optimizing a desired future behavior $203c$ of the vehicle in presence of constraints $214c$. The MPC uses an internal prediction model using the motion model $212c$ and selected parameters $213c$ defining the tire friction function, and optimizes the vehicle behavior given model $212c$ and parameters $213c$. In such a case, the MPC determines the optimal control commands to obtain an optimal state trajectory. In order to do this, the variation of the friction over the prediction horizon is determined using the tire friction function defining the relation between slippage of the wheel and the friction.

For example, In one embodiment, the control command is determined by solving a tracking-type optimal control problem formulation $$\min_{X,U} \frac{T}{N} \sum_{i=0}^{N-1} \|F_{ref}(x_i) - y_{ref}(\tau_i, d)\|_W^2 + \|x_i - x_{ref}\|_Q^2 +$$
$$\|u_i - u_{ref}\|_R^2 + \|F_{ref}(x_N) - y_{ref}(\tau_N, d)\|_{W_N}^2 + \|x_N - x_{ref}\|_{Q_N}^2$$

s.t. $x_0 = \hat{x}_0$, $x_{i+1} = F_i(x_i, u_i)$, $i = 0, \ldots, N-1$, $0 \geq h(x_i, u_i)$, $i = 0, \ldots, N-1$, $0 \geq r(x_N)$, where $x_{i+1} = F_i(x_i, u_i)$ is the discrete-time motion model $212c$ and $0 \geq h(x_i, u_i)$, $0 \geq r(x_N)$, are the constraints $214c$. The optimal control problem is known as a nonlinear programming (NLP), and there are various methods to solve this problem.

In one embodiment, the NLP is solved using sequential quadratic programming (SQP) using real-time iterations (RTIs). The RTI approach is based on one SQP iteration per control time step, and using a continuation-based warm starting of the state and control trajectories from one time step to the next. In this embodiment, each iteration includes at least two steps: (1) Preparation phase: discretize and linearize the system dynamics, linearize the remaining constraint functions, and evaluate the quadratic objective approximation to build the optimal control structured QP subproblem; and (2) Feedback phase: solve the QP to update the current values for all optimization variables and obtain the next control input to apply feedback to the system.

Another embodiment uses block structured factorization techniques with low-rank updates to preconditioning of an iterative solver within a primal active-set algorithm. This results in a relatively simple to implement, but computationally efficient and reliable QP solver that is suitable for embedded control hardware.

Figure 2D:
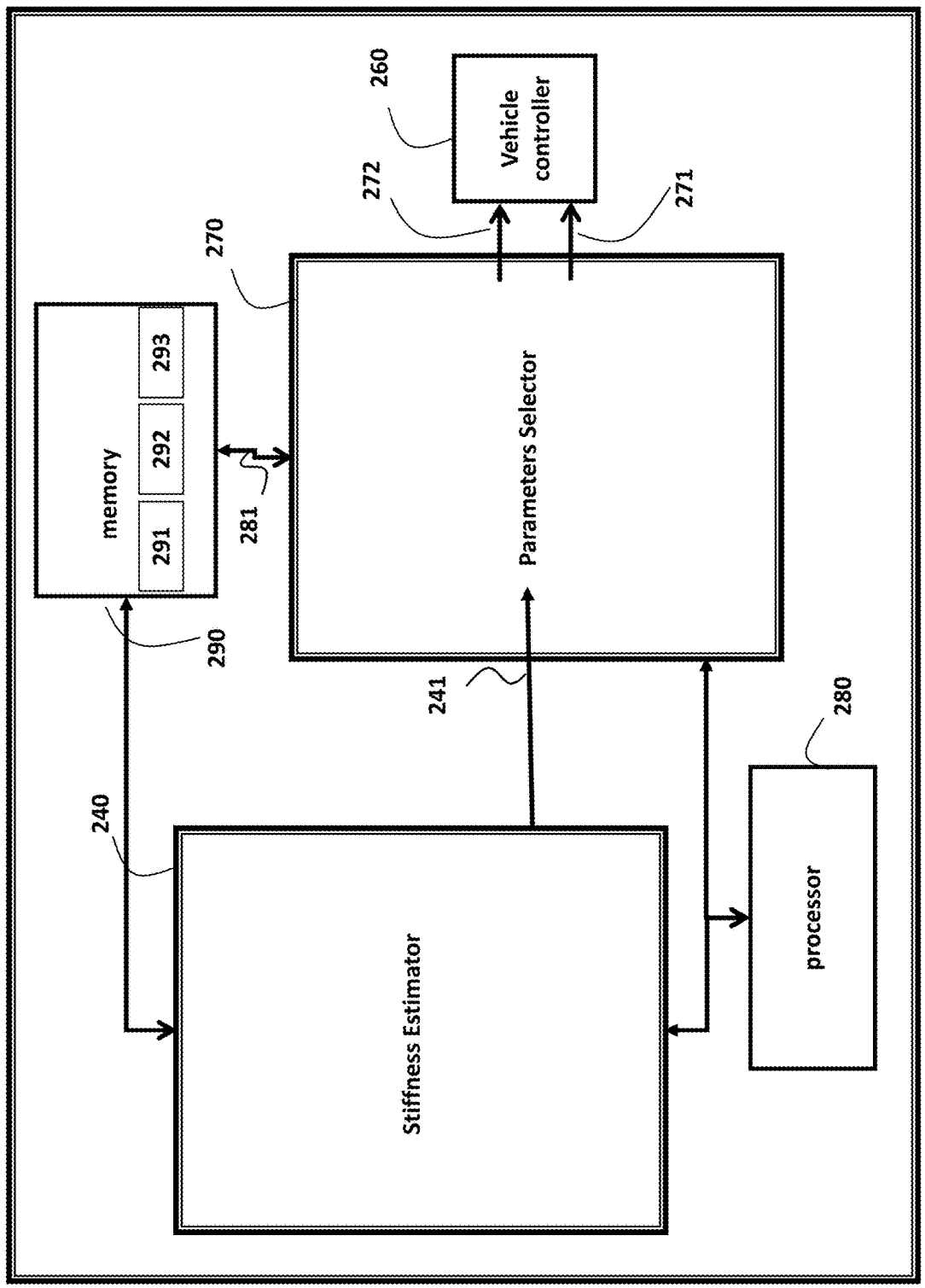
FIG. 2D shows a general structure of the connection of the state-of-stiffness estimator and parameter selector according to one embodiment.

FIG. 2D shows a general structure of the connection of the state-of-stiffness estimator 240 and parameter selector 270 according to one embodiment. The parameter selector 270 is connected to at least one processor 280 for executing modules of the parameter selector 270. Similarly, the state-of-stiffness estimator 240 is connected to at least one processor 280 for executing modules of the estimator 240. The processor 280 is connected 281 to a memory 290 that stores the parameters of multiple friction functions 291 of the states and parameters and the vehicle information 292. The memory 290 also stores 293 the internal information of the estimator, including, but not limited to, values of the state of stiffness, values of each computed state of the vehicle, and the motion leading up to each state of the vehicle.

Figure 2E:
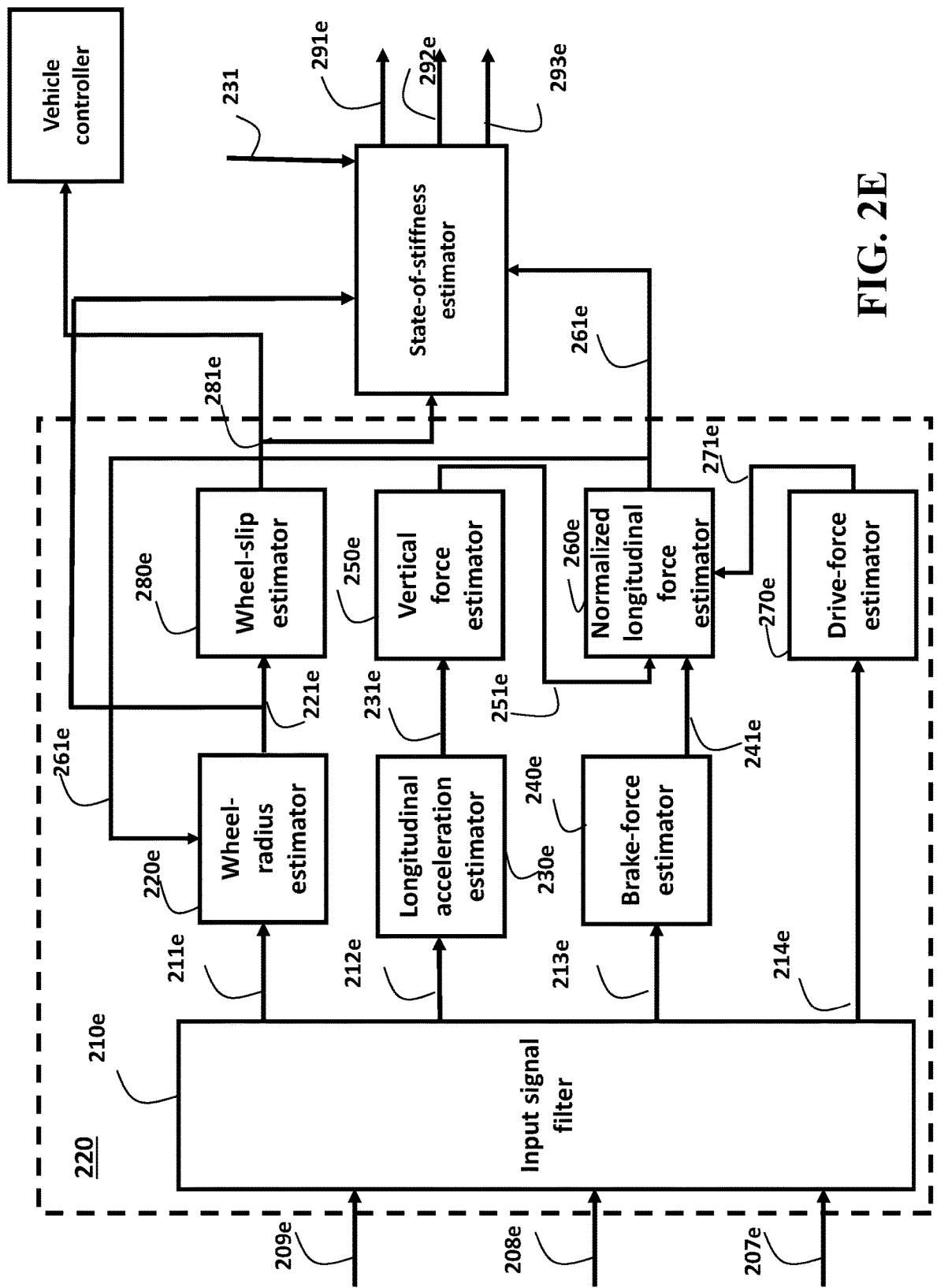
FIG. 2E shows a block diagram of a method for determining or estimating the internal signals from the vehicle according to one embodiment.

FIG. 2E shows a block diagram of a method for determining or estimating the internal signals from the vehicle according to one embodiment. The steps leading up to 281e and 261e can be implemented into a control unit or circuit arrangement, which can be used in systems such as ABS, ESP, ADAS, or in autonomous vehicles. For example, input signal filter 210e can determine the input signals by processing rotational rate of the wheels or tires 209e to produce a signal 211e, whereby the rotational rates can be determined for each individual wheel or tire of the vehicle. The filter 210e can also determine the input signal 212e by processing the brake pressure 208e and determine the input signal 213e by processing the rotational rate and torque from the engine 207e.

The block 230e determines the longitudinal acceleration 231e, while a brake-force estimator 240e estimates the braking force 241e for each wheel using the applied brake pressures 213e. From the values of the engine torques and rotation rate 214e of the engine, a module 270e in the control unit estimates the driving force in the longitudinal direction, while the vertical force 251e is estimated in 250e, for example using estimates of the longitudinal acceleration 231e. Using the vertical force estimates 251e and the longitudinal force estimates 241e and 271e, the normalized longitudinal force 261e can be determined by a longitudinal force estimator 260e. A wheel-radius estimator 220e uses the processed rotational rates 211e of the tires or wheels and the estimate of the normalized driving force 261e to correct the wheel radius and outputs the wheel radius with the rotation rates 221e. Thus, the signal conditioner 220 can provide the state-of-stiffness estimator 240 with estimates of the longitudinal velocity 221e, wheel-slip estimates 281e determined by a wheel slip estimator 280e, or normalized longitudinal force 261e, or a combination thereof. Accordingly, in one embodiment the current state of stiffness is determined by a filter that uses the information 221 from the signal conditioner. In another embodiment, the wheel-slip estimates 281e are propagated to the vehicle controller 260. Accordingly, in some embodiments, the state-of-stiffness estimator uses the estimates of one or combination of the longitudinal velocity 221e, wheel-slip estimates 281e, and normalized longitudinal force 261e. Additionally or alternatively, a sensing system 230 provide to the state-of-stiffness estimator measurements of lateral acceleration and heading rate 231, to estimate state of stiffness including lateral tire-stiffness parameters 291e, lateral friction coefficients 292e, and/or to classify the road surface 293e.

Figure 3A:
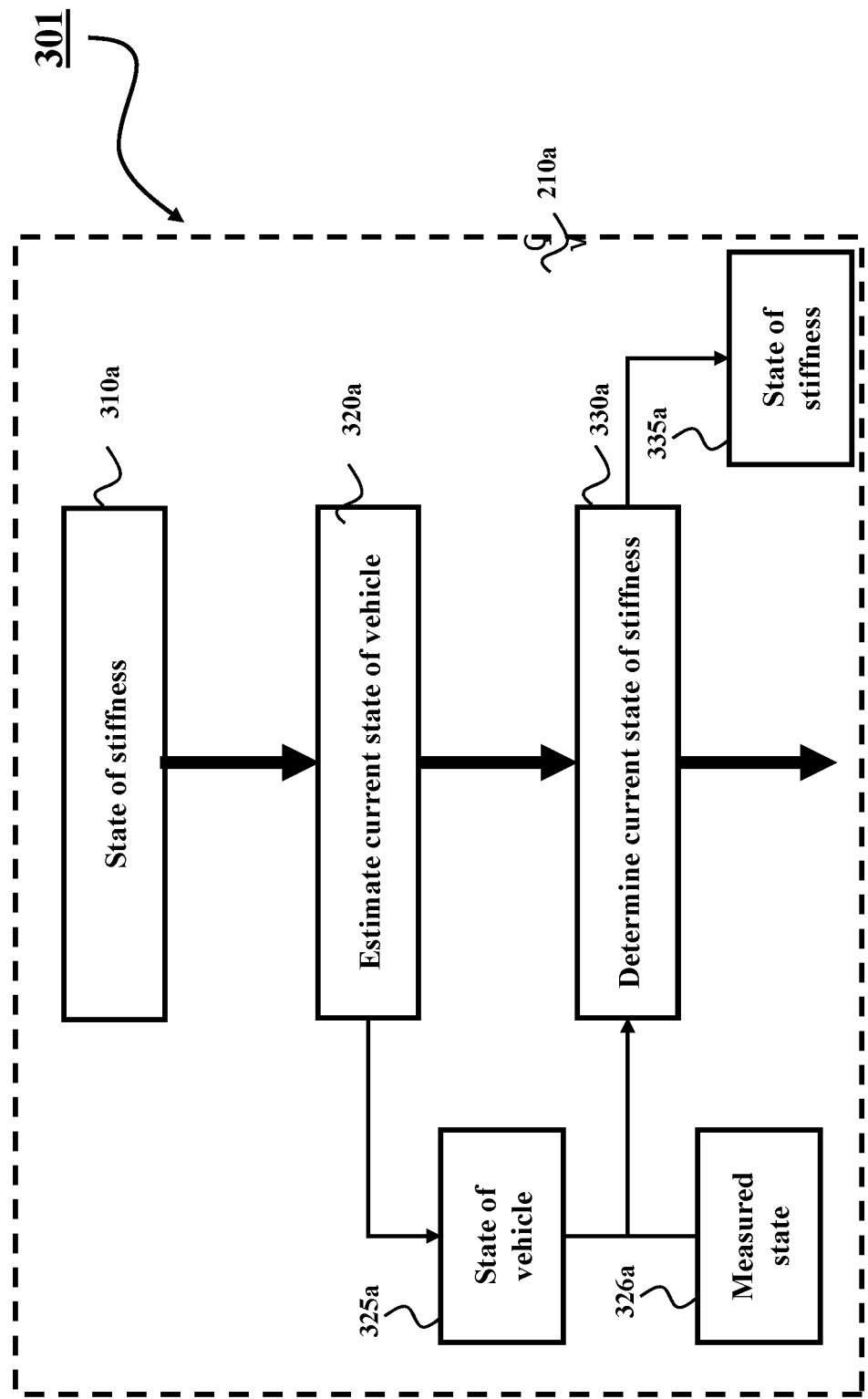
FIG. 3A shows a flowchart of one iteration of a method for implementing the method for determining the state of stiffness according to some embodiments.

FIG. 3A shows a flowchart of one iteration of a method for implementing the method 210a for determining the state of stiffness according to some embodiments. In one embodiment the method is implemented by a filter 301 configured to determine the current state of stiffness of at least one tire by comparing a current state of the vehicle estimated using the stiffness of the tire with measurements of the current state of the vehicle, wherein the measurement is such as those in signal 221. The method uses the state of stiffness 310a, determined during a previous iteration, to estimate 320a the current state of the vehicle. Next, the method determines 330a a current state of stiffness by comparing the current state of the vehicle 325a with measurements 326a of the current state of the vehicle, to produce an estimate of a current state of stiffness 335a.

In some embodiments, the filter 301 is deterministic, i.e., determine a numerical value of the stiffness. For example, the deterministic filter can be implemented using bins of collected data to approximate a nonlinear function and minimizing error of friction and tire stiffness using nonlinear optimization. Additionally, or alternatively, in some embodiments, the filter 301 is a probabilistic filter configured to determine a probabilistic distribution of the current state of the stiffness of the tire with a mean indicative of the type of the surface of the road and a variance indicative of uncertainty caused by external disturbances. Some embodiments are based on recognition that the measurements 231 from the sensing system 230 of FIG. 2B that are sent to the state-of-stiffness estimator, either directly or after some preprocessing 220 resulting in preprocessed measurements 221, have measurement noise that affects the measurement quality. For instance, an inertial measurement unit (IMU) measuring an acceleration and a heading rate of the vehicle, has noise and time varying bias, that is, offsets, that make the measurements uncertain.

To this end, several embodiments use a probabilistic filter to determine the current state of stiffness. For instance, in one embodiment the filter determines a probability distribution function of the state of the vehicle and the state of the stiffness at every time step, as more measurements are gathered in real time. The probability distribution function can then be used to determine important characteristics of the state of stiffness useful for parameter selection. For example, the probabilistic filter outputs a mean of the probability distribution of state of stiffness and a variance of the state of stiffness determined from the probability distribution.

Some embodiments use the determined mean and variance of the state of stiffness for selecting parameters corresponding to a certain tire friction function, which can be used to control the vehicle. For instance, in one embodiment the mean of the state of stiffness is indicative of the type of surface of the road, for example, asphalt or snow, and the variance is indicative of uncertainty caused by external disturbance, for example, holes in the road or wind gusts which makes the certainty of the knowledge of the road decrease, since these disturbances affect the measurements.

Examples of the probabilistic filter include a Kalman-type filter with the mean and variance augmenting the state of the vehicle, a particle filter, or a Kalman-type filter with mean and variance deduced from a so-called variational Bayes procedure. In such cases, the state of stiffness can be determined by augmenting the state of the vehicle with the state of the stiffness and using a motion model of the state of stiffness.

Figure 3B:
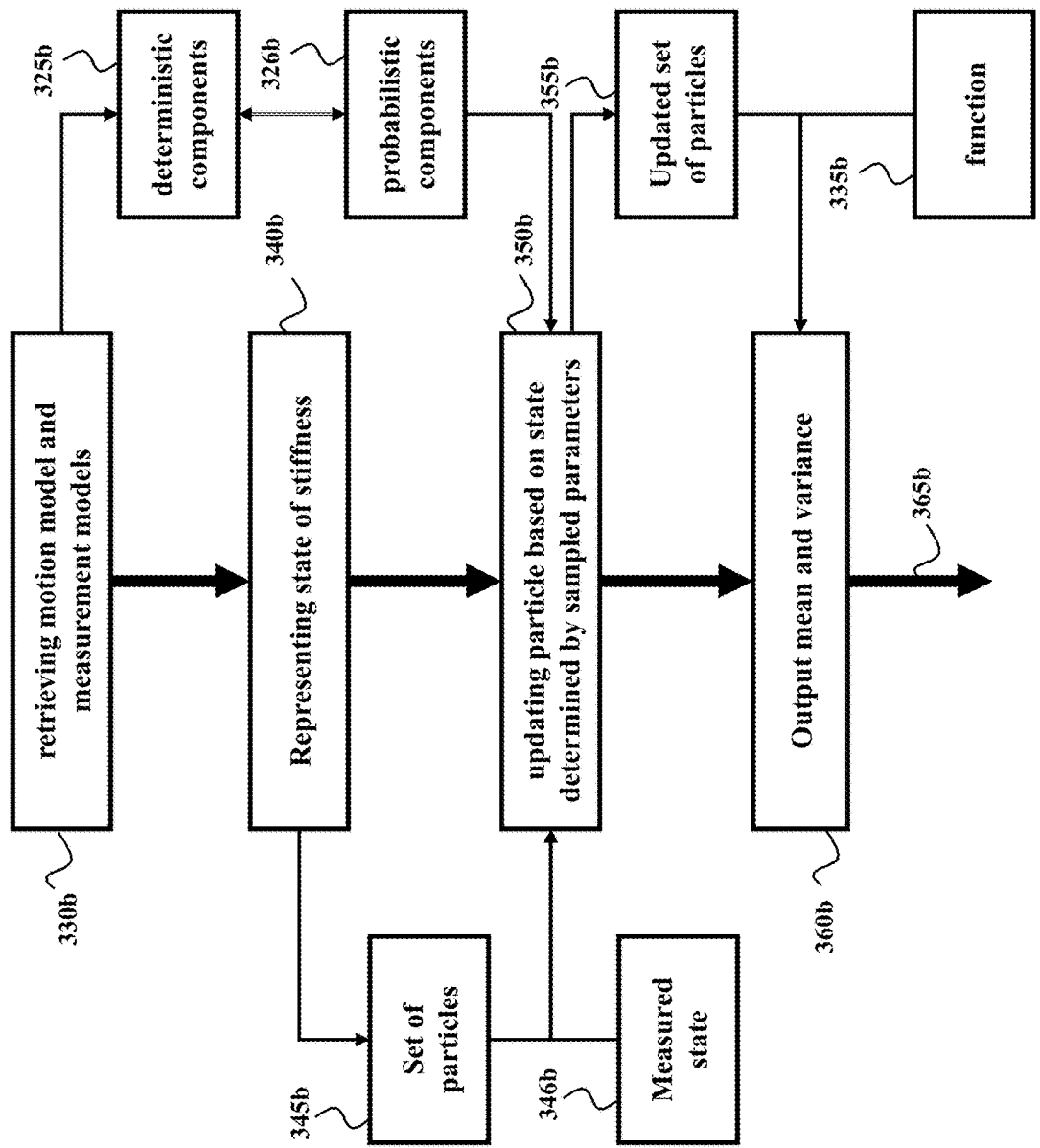
FIG. 3B shows a flowchart of a method for jointly estimating a state of a vehicle and a state of stiffness of tires of the vehicle according to one embodiment.

FIG. 3B shows a flowchart of a method for jointly estimating a state of a vehicle, e.g., a velocity and a heading rate of the vehicle, and a state of stiffness of tires of the vehicle according to one embodiment. This embodiment is based on recognition that the unknown tire parameters can be regarded as stochastic disturbances acting on a, otherwise deterministic, model of a motion of the vehicle. The nature of the stochastic disturbance causes the vehicle to have different possible motions, and therefore different possible states.

To that end, some embodiments retrieve 330b from a memory a motion model of the vehicle and a measurement model of the vehicle having deterministic 325b and probabilistic 326b components. For example, the motion model of the vehicle includes a combination of a deterministic component of the motion and a probabilistic component of the motion, wherein the deterministic component of the motion is independent from the state of stiffness and defines the motion of the vehicle as a function of time, and wherein the probabilistic component of the motion includes the state of stiffness having an uncertainty and defines disturbance on the motion of the vehicle. Similarly, the measurement model of the vehicle includes a combination of a deterministic component of the measurement independent from the state of stiffness and a probabilistic component of the measurement that includes the state of stiffness.

The embodiment represents the state of stiffness 340b and the state of the vehicle with a set of particles 345b. Each particle includes a state of the vehicle, which can be a measured state or the state determined during a previous iteration of the joint estimation. Additionally, or alternatively, the particle includes a mean and variance of the state of stiffness defining a feasible space of the parameters of the state of stiffness. Representing the state of stiffness probabilistically, i.e., using the mean and the variance allows considering the stochastic disturbance on the motion of the vehicle. However, the mean and variance of the state of stiffness do not fit into the model of the vehicle. To that end, the embodiment samples the feasible space of the parameters of the state of stiffness defined by the mean and the variance and use the sampled parameter in the joint estimation.

Figure 3C:
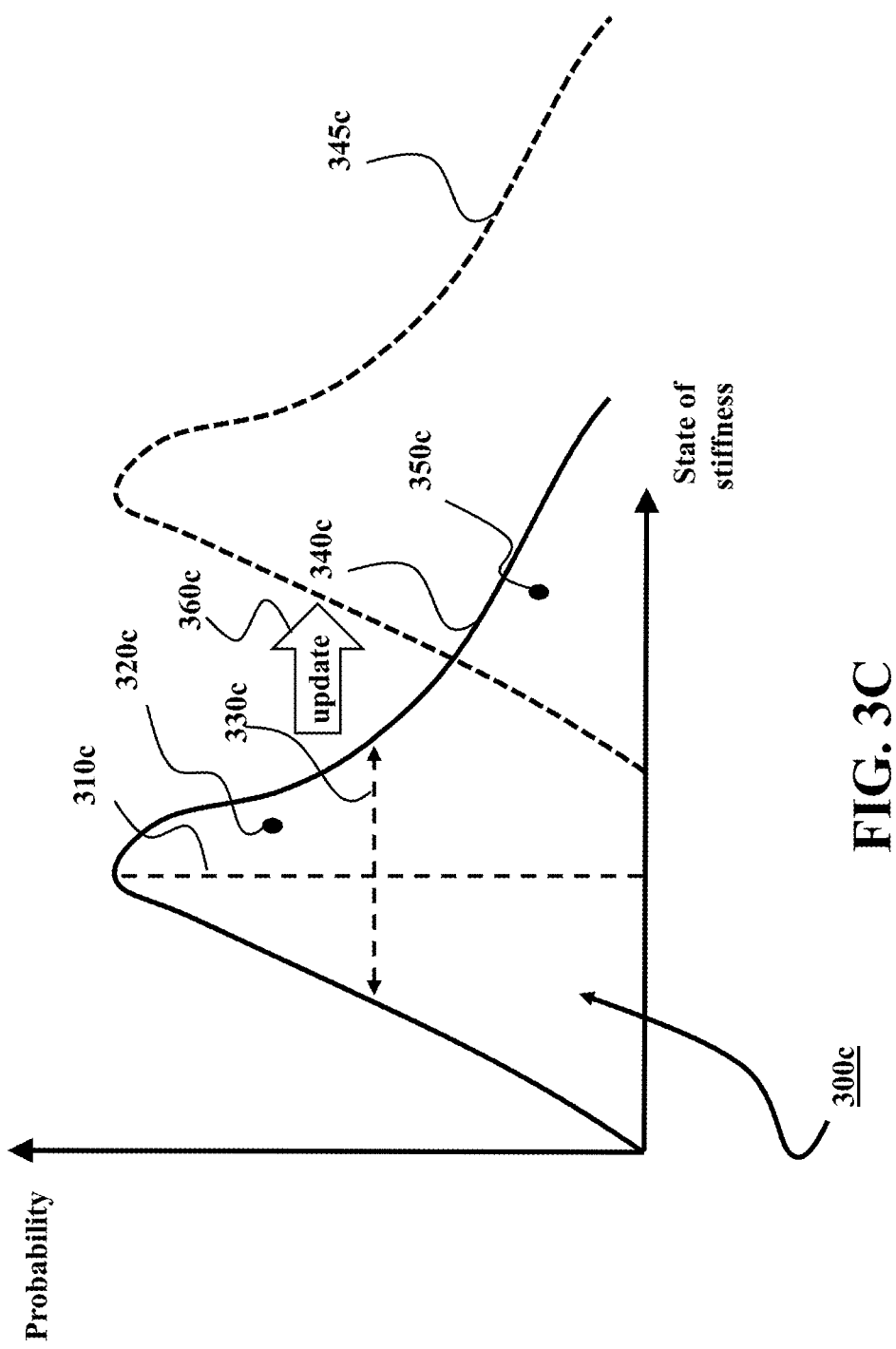
FIG. 3C shows a graph illustrating probability distribution function defining the feasible space of the state of stiffness used by some embodiments.

FIG. 3C shows a graph illustrating probability distribution function 340c defining the feasible space 300c of the state of stiffness used by some embodiments. The shape of the function 340c can be determined in advance. For example, if the distribution of the state of stiffness is Gaussian, the shape of the distribution 340c is the "Gaussian hat" shape. If the shape is fixed, the mean 310c and the variance 330c define the distribution 340c and the feasible space 300c from which the sample parameter of the state of stiffness can be drawn.

As used herein, sampling the parameter of the state of stiffness is drawing the parameter with probabilities defined by the distribution 340c, which is in turn defined by the mean and the variance of the state of stiffness. For example, according to the distribution 340c, the probability of a sample 320c to be drawn or sampled is higher than the probability of the sample 350c. Such a representation allows updating 360c the mean and the variance of the state of stiffness to produce an updated distribution 345c defining updated feasible space for sampling state of stiffness. This embodiment is based on observation that the update of the mean and the variance of the state of the stiffness influence the value of the parameter of the state of stiffness used in the subsequent iteration, because such a parameter is drawn from the updated distribution.

To that end, the method updates 350b at least one of the particles, including the mean and variance of the state of stiffness to produce the updated set 355b. For example, the embodiment updates iteratively the mean and the variance of at least some particles using a difference between an estimated state of stiffness estimated using the motion model of the vehicle including the state of stiffness with parameters sampled on the feasible space of the particle and the measured state of stiffness determined according to the measurement model using measurements 346b of the state of the vehicle.

Next, the method outputs 360b a mean and a variance of the state of stiffness 365b determined as a function 335b of the updated mean and the updated variance in at least one particle. Example of the function 335b include an average, e.g., a weighted average of the means and the variances of the particles in the set and a maximal function selecting the mean and the variance of the particle with the largest probability of representing the measured state 346b.

For example, in one implementation, the method determines a probability distribution of the state of the vehicle and the state of the stiffness using a probability distribution of the measurement model centered on the measured state. The probability distribution of the measurement model can be determined in advance, e.g., using the values of variance of state of stiffness determined during previous time instants. Next, the method determines the probability of each particle to represent the true state of the stiffness according to a placement of the mean in the particle on the probability distribution of the state of the vehicle and the state of the stiffness. Such a probability is used by the function 335b in determining the output 365b.

In some embodiments, the controller selects, from the multiple set of parameters corresponding to friction functions stored in memory, parameters according to the mean value of the estimated state of stiffness. For instance, in one embodiment the controller selects the friction function that has the best fit according to the estimated state of stiffness, that is, when comparing the stiffness of the multiple friction functions, the friction function that has a stiffness closest to the estimated current state of stiffness is selected. In other embodiments, the estimated variance of state of stiffness is used in the selection, to account for that the measurements and the model of motion of the vehicle is uncertainty.

Figure 4A:
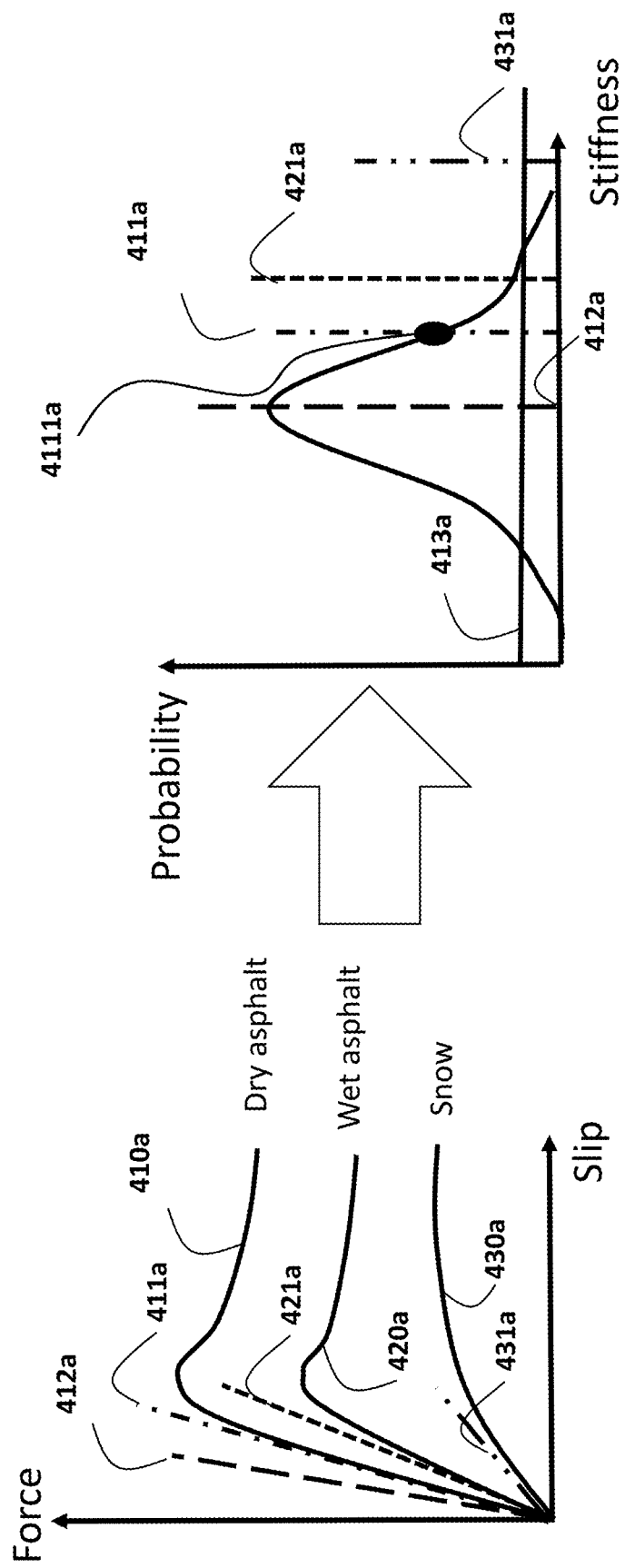
FIG. 4A shows a graph illustrating probabilistic selection of parameters of a friction function according to one embodiment.

FIG. 4A shows a graph illustrating probabilistic selection of parameters of a friction function according to one embodiment. In this example, there are three friction functions 410a, 420a, and 430a stored in memory, with stiffness 411a, 421a, and 431. The estimated mean of the current state of stiffness is 412a, which is different from 411a, 421a, and 431a. In selecting whether to use friction function 410a, 420a, or 430a for control, the embodiment places the stiffness of the friction functions in the probability distribution centered at the estimated current state of stiffness, and selects the friction function with highest probability 4111a above a threshold 413a. For instance, in FIG. 4A the stiffness 411a corresponding to the friction function for asphalt has the highest probability and is therefore selected.

Figure 4B:
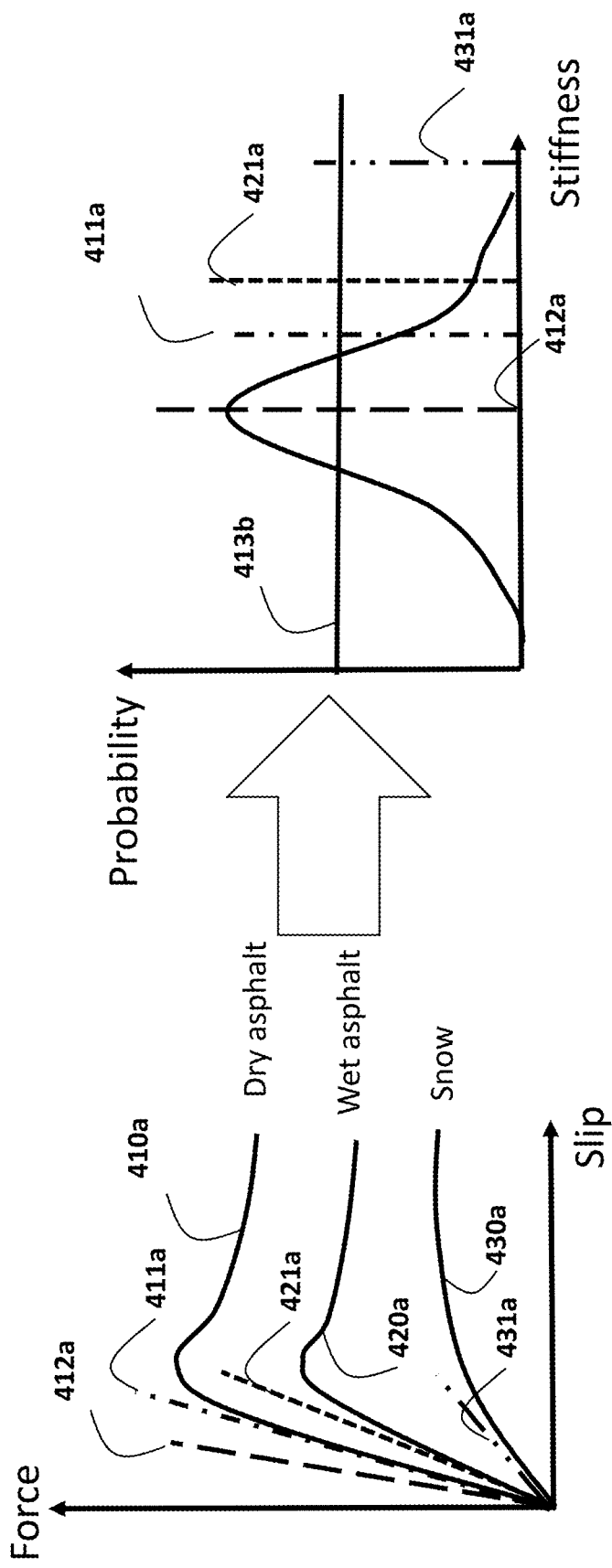
FIG. 4B shows a graph illustrating probabilistic selection of parameters of a friction function according to another embodiment.

FIG. 4B shows a graph illustrating probabilistic selection of parameters of a friction function according to another embodiment. FIG. 4B shows a situation where there is no state of stiffness that has highest probability above a threshold, which means that no state of stiffness is likely to correspond to any friction function in the library. This can happen, for example, when there are outliers in the measurement data or other uncertainties leading to drastically changes stiffness estimates, or when there suddenly is not enough friction functions in the memory, for instance, when a vehicle suddenly enters gravel but friction function corresponding to gravel is not stored in memory. In such a situation, there are several options used by different embodiments. For example, one embodiment selects the friction function corresponding to the lowest peak friction, since it is typically safer for passengers of a vehicle to assume a lower friction surface, such that the controller becomes conservative. In another embodiment, the most recent friction function that was above the threshold 413b was chosen. For instance, this is suitable when the state of stiffness estimate is due to a sudden error in the measurements.

Figure 4C:
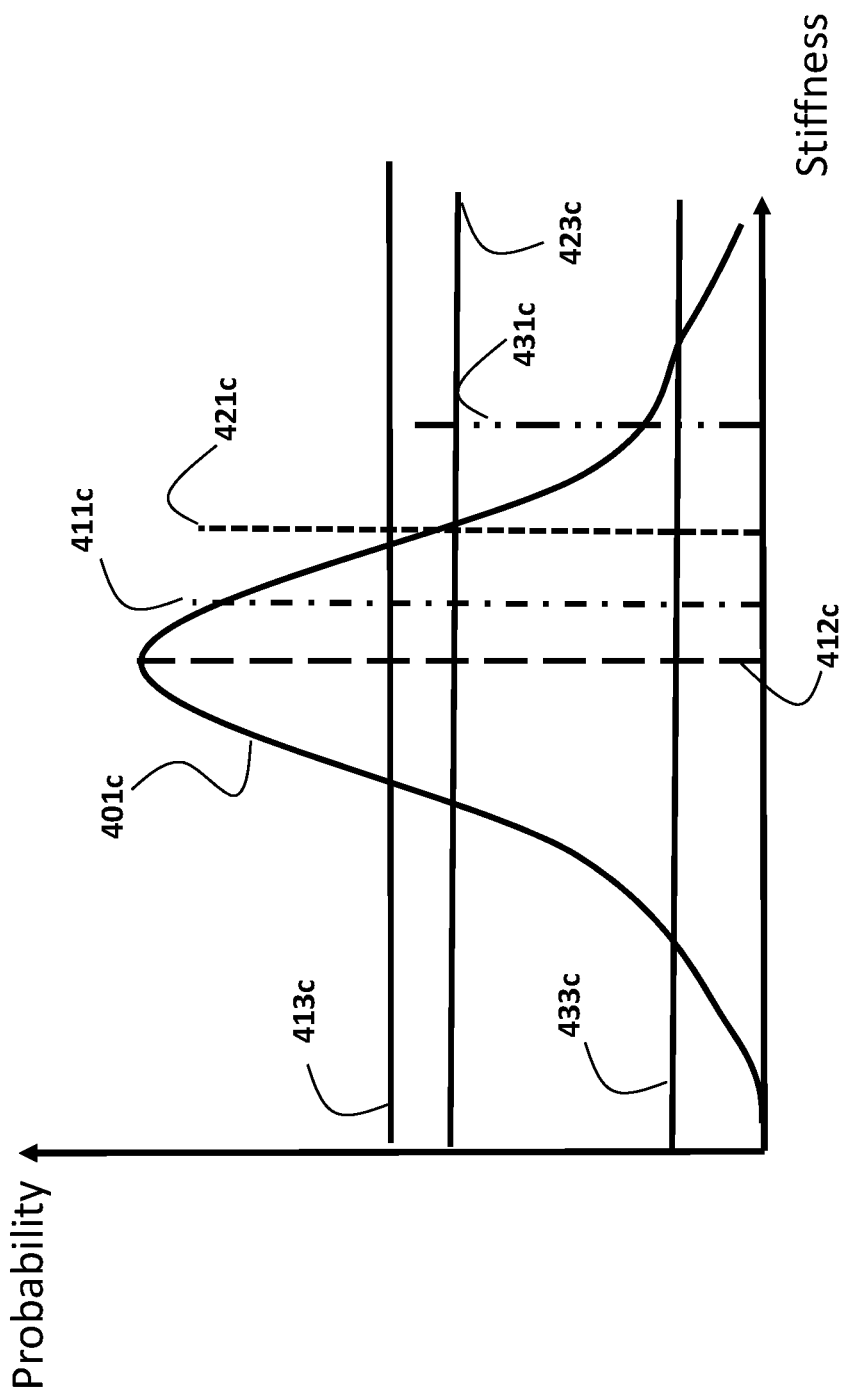
FIGS. 4C, 4D, and 4E show graphs illustrating probabilistic selection of parameters of a friction function according to some embodiments.
Figure 4D:
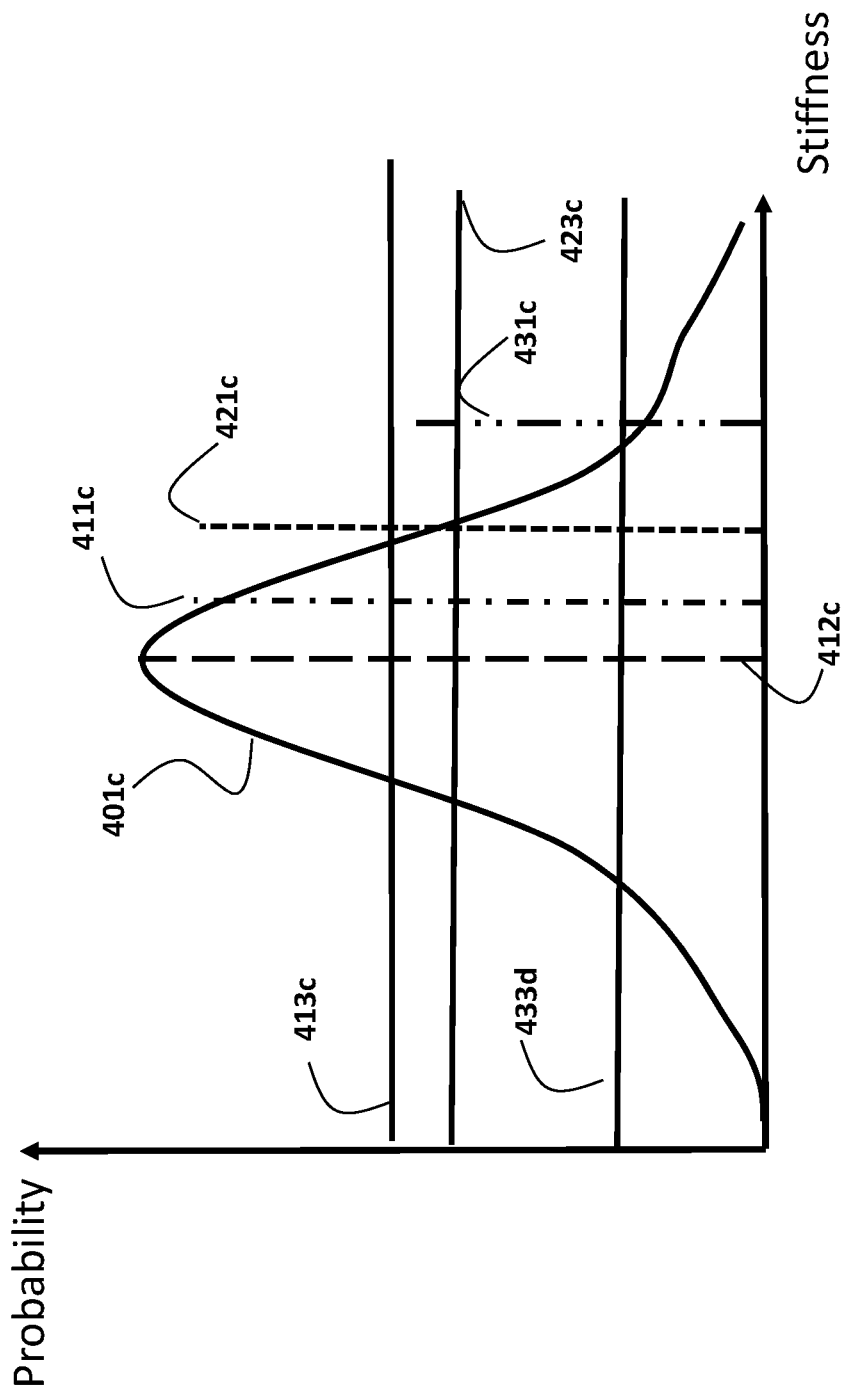
Figure 4E:
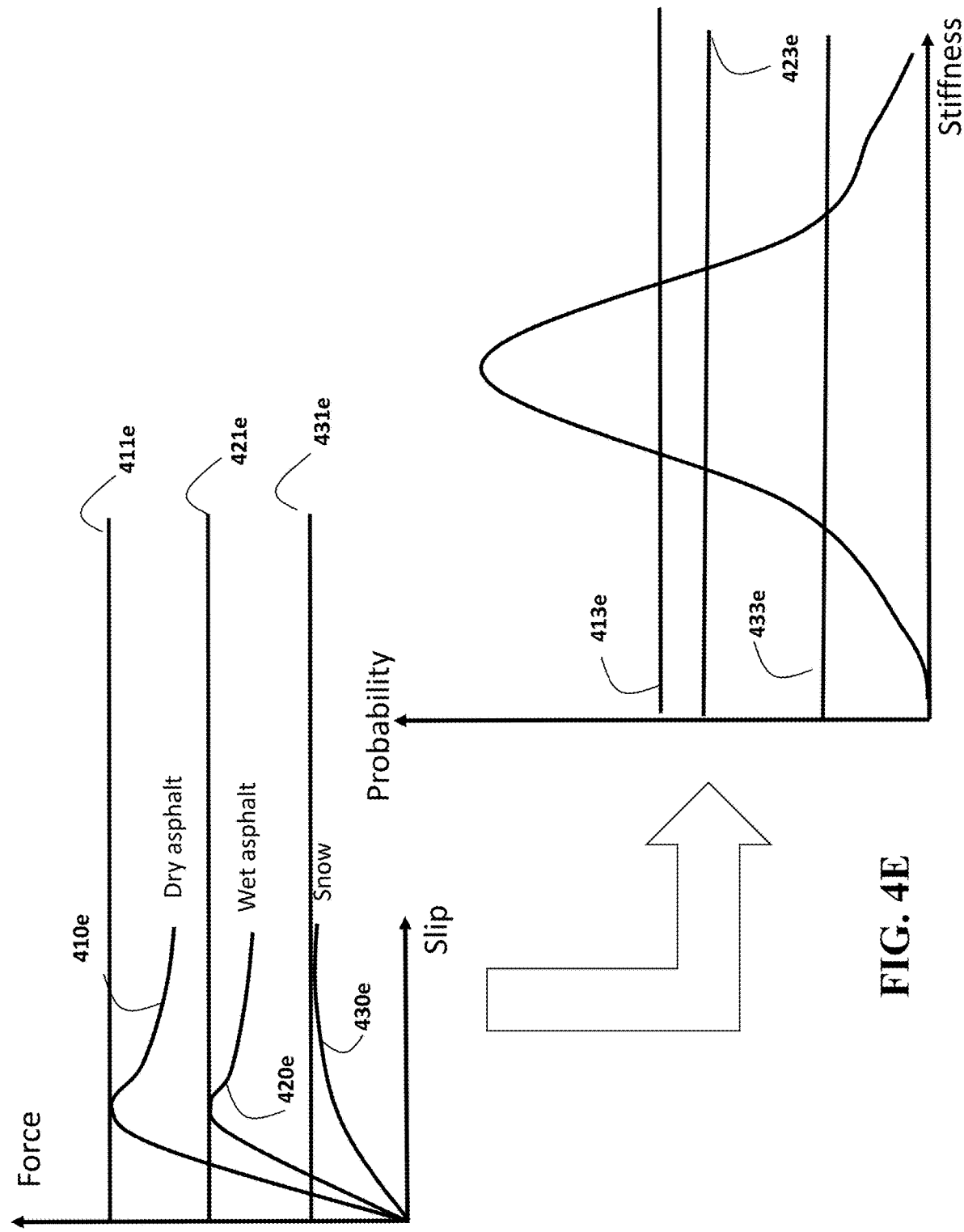

FIGS. 4C, 4D, and 4E show graphs illustrating probabilistic selection of parameters of a friction function according to some embodiments. In these embodiments, the estimated state of stiffness is used to select the friction function according to the probabilistic distribution of the current state of the stiffness above a corresponding threshold, wherein different thresholds correspond to different friction functions.

For instance, referring to FIG. 4C, the probability of 411c, 421c, and 431c, are all above their corresponding thresholds 413c, 423c, and 433c, when placing the stiffness on the probability distribution 401c of state of stiffness centered at the mean 412c. Hence, the controller selects the friction functions 411c, 421c, and 431c with a probability according to the probabilistic distribution of the current state of the stiffness. However, in FIG. 4D only 411c and 421c are above the corresponding thresholds 413c, 423c, and 433d, such that only 411c and 421c are selected with a probability according to the probabilistic distribution of the current state of the stiffness.

In some embodiments, the thresholds are chosen according to the peak friction of the respective friction functions. For instance, a threshold corresponding to a friction function is proportional to a value of the peak friction of the friction function, such that a first threshold for a first friction function having a first peak friction is less than a second threshold for a second friction function having a second peak friction when the second peak friction is larger than the first peak friction. Referring to FIG. 4E, threshold 413e is larger than 423e, which is larger than 433e, where the peak friction 411e of the friction function 410e is larger than the peak friction 421e of the friction function 420e, which is larger than the peak friction 431e of the friction function 430e.

In effect, variable thresholds allow to select the parameters of friction function conservatively thereby increasing the safety of the vehicle control. For example, if the current stiffness belongs with some different probabilities to multiple friction functions, the friction function of a more slippery road surface is selected.

Figure 5A:
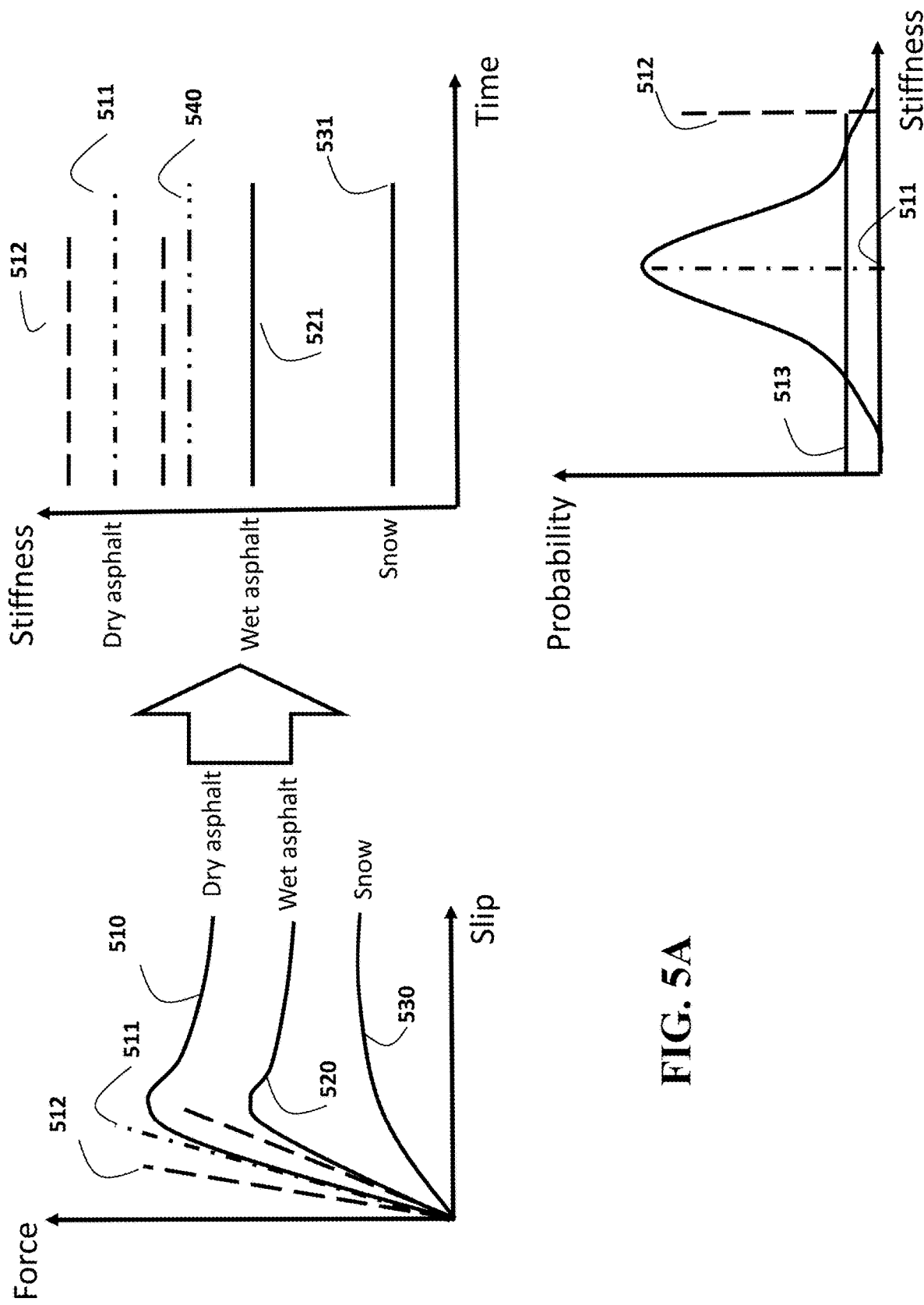
FIG. 5A shows a graph illustrating the classification of surface according to one embodiment.

FIG. 5A shows a graph illustrating the classification of surface according to one embodiment. The updated state of stiffness is used to select a friction function from the multiple friction functions. FIG. 5A shows a situation where the state-of-stiffness estimator identifies the state of stiffness to have a mean 511 and the variance 512. The stiffness estimate 511 is uncertain, but the uncertainty is smaller than some predefined threshold 540, so the stiffness value can with some predefined probability value be claimed to categorize the road surface as dry asphalt. The threshold can be defined as the value of 99% certainty, 99.5% certainty, or some other value. The threshold can also be made adaptive. For example, the threshold can be chosen to depend on the velocity of the vehicle.

To that end, some embodiments classify the surface of the road using the mean and variance of the state of stiffness. For example, one embodiment determines a type of the surface based on a value of the mean of the state of stiffness unless the variance of the state of stiffness covers a value corresponding to a different type of the surface, such as wet asphalt 521 or the surface covered with snow 531. Using FIG. 5A as an example, the embodiment classifies the type of the surface as the dry asphalt unless the variance of the state of stiffness allows classifying the surface as wet asphalt even with the low probability. Additionally, or alternatively, one embodiment determines a type of the surface based on a value of the mean of the state of stiffness and just determines a probability of the surface to have the type based on the variance of the state of stiffness. Using FIG. 5A as an example, the embodiment classifies the type of the surface as the dry asphalt with a probability determined by the difference between one and 513. For example, if 512 is chosen as three standard deviations from 511, where in the standard deviation is the square root of the variance, the embodiment classifies the type of surface as the dry asphalt with a probability approximately equal to 0.997.

In one embodiment, the classification of the types of surface is used to retrieve the parameters of the friction function from the memory corresponding to the type of the surface. For instance, the classification procedure determines the road as dry asphalt, and the parameters from the multiple friction functions stored in memory corresponding to dry asphalt is retrieved and used for controlling the vehicle.

Figure 5B:
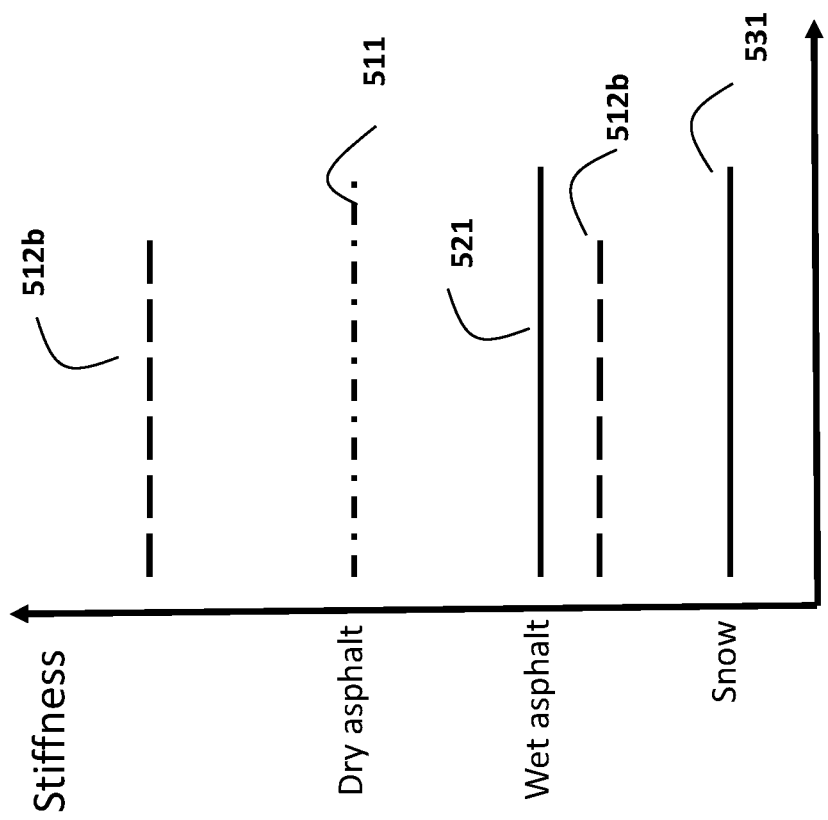
FIG. 5B shows a schematic of selecting parameters of a friction function according to one embodiment when multiple friction function can have the determined stiffness with different probabilities.

FIG. 5B shows a schematic of selecting parameters of a friction function according to one embodiment when multiple friction function can have the determined stiffness with different probabilities. In this embodiment, the variance 512b of the determined state of stiffness 511 covers both dry and wet asphalt. However, since from FIG. 4E wet asphalt has a smaller peak friction than dry asphalt, the surface selected is wet asphalt. In other words, one embodiment selects the type of surface covered by the variance of the state of stiffness with smallest value of the peak friction.

Some embodiments treat the unknown state of stiffness as stochastic disturbances acting on the, otherwise deterministic, model of the motion of the vehicle. The nature of the stochastic disturbance causes the vehicle to have different possible motions, and therefore different possible states. To that end, some embodiments are based on realization that the motion model of the vehicle includes a combination of a deterministic component of the motion and a probabilistic component of the motion. The deterministic component of the motion is independent from the state of stiffness and defines the motion of the vehicle as a function of time. On the other hand, the probabilistic component of the motion includes the state of stiffness having an uncertainty that acts as the disturbance on the motion of the vehicle. In such a manner, the motion of the vehicle can be modeled including the state of stiffness of the tires without knowing a model of the motion (time evolution) of the state of stiffness.

In some embodiments, the state of the vehicle evolves dynamically in time according to a model of the motion of the state of the vehicle. If choosing the model of the motion of the vehicle and the model of the forces of the tires carefully, the motion of the state of the vehicle can be described as one deterministic part, which is entirely determined by the state of the vehicle, and one uncertain part, where the uncertain part is dependent on both the state of stiffness of the tires and the uncertainty of the measurements of the state of the vehicle. For example, the model of the motion of the vehicle can be described according to some nonlinear function $x_{x+1} = f(x_k, u_k) + g(x_k, u_k)w_k$, where $f \in \mathbb{R}^n$ is a nonlinear deterministic function describing the evolution of the state of the vehicle, $g \in R^{n \times d}$ is a nonlinear deterministic function dependent on the state of the vehicle. Mapping the disturbances $w_k \in R^d$, k is the discrete time index, $X \in R^n$ is the state, and $u_k$ contains the inputs to the system. The dynamic model of the motion of the vehicle depends on the state of stiffness, including mean of the stiffness, variance of the stiffness, and friction coefficient in each direction of each tire. In some embodiments, the disturbance $w_k \in R^d$ affecting the motion of the vehicle is due to uncertainties in the numerical description of the tire stiffness. In other embodiments, the state of the vehicle includes a velocity vector and a heading rate of the vehicle.

Some embodiments acknowledge that the state of stiffness of the tires can be accurately estimated, by considering the state of stiffness, states of the vehicle, and bias terms of the measurements jointly. In one embodiment, the quantities are estimated by assigning probabilities to how likely the combination of the quantities explains the measurement vector.

Figure 6A:
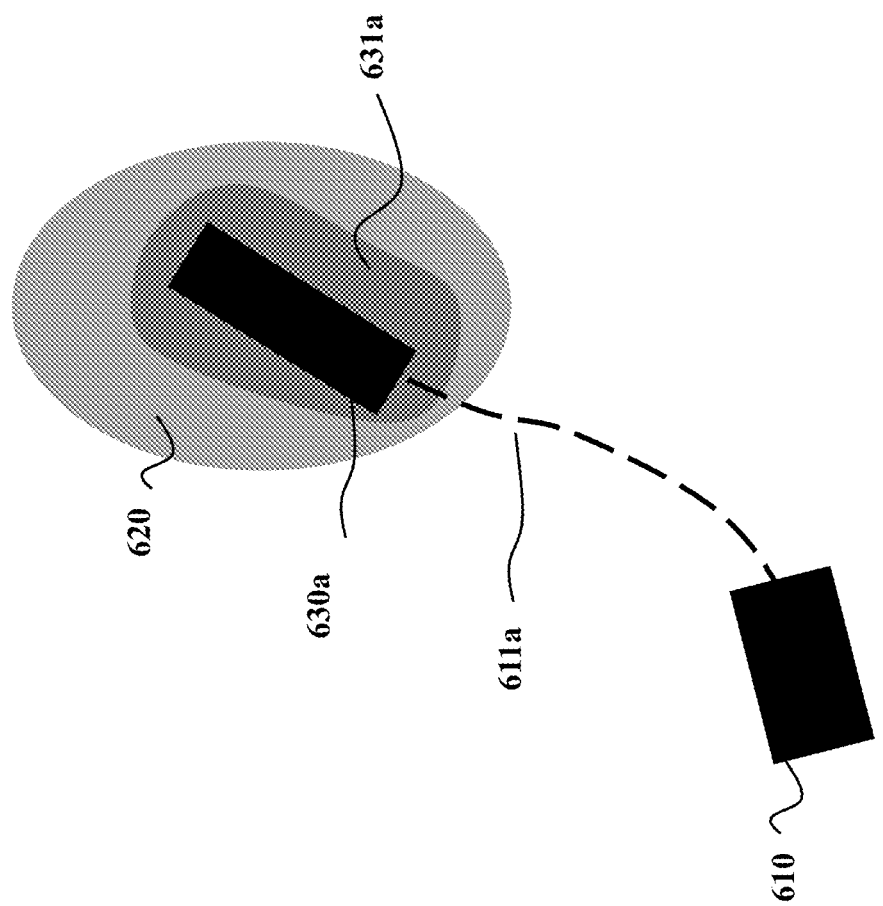
FIG. 6A illustrates a scenario where the vehicle has an initial state 610 as used by one embodiment.

FIG. 6A illustrates a scenario where the vehicle has an initial state 610 as used by one embodiment. For one set of parameters of the tires and a given input to the system, the vehicle obeys the motion 611*a* and ends up in 630*a*, with resulting uncertainty 631*a*. The uncertainty of the sensing system 230 leads to that the state of the vehicle can only be known up to a certain area 620. However, the end state of the vehicle 630*a* well resides within the area 620, so this particular combination of state of stiffness, bias terms, and initial state of the vehicle, is given a high probability of being a good combination.

Figure 6B:
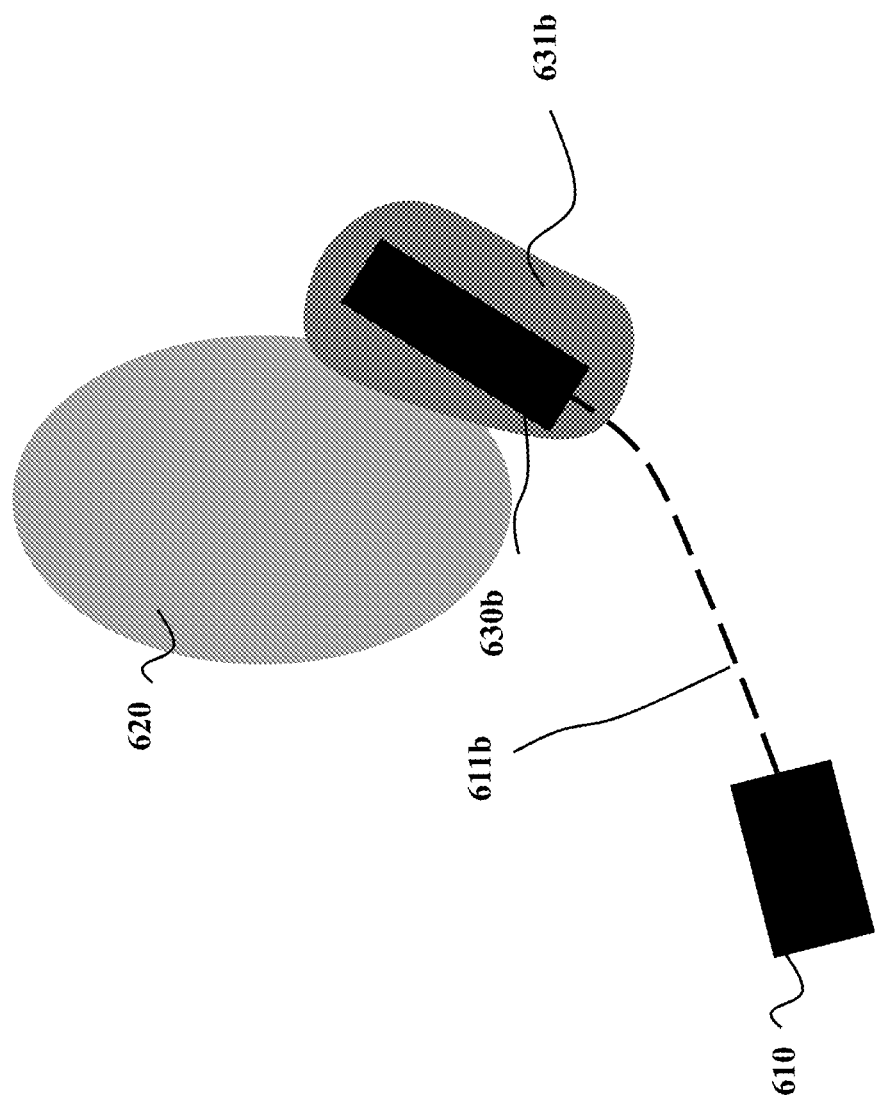
FIG. 6B shows a vehicle with the same initial state 610, possibly with the same bias terms of the sensors, but with another particular set of parameters of the tires according to one embodiment.

FIG. 6B shows a vehicle with the same initial state 610, possibly with the same bias terms of the sensors, but with another particular set of parameters of the tires according to one embodiment. For the same inputs to the system, the vehicle 610 now obeys the motion 611*b*, leading to that the vehicle ends up in state 630*b*, with resulting uncertainty 631*b*. However, this end state 630*b* of the vehicle does not reside within the certainty area of the sensors. Thus, this particular combination of initial state, parameters of the tires, and bias terms, is assigned a low probability of being a good combination.

Figure 6C:
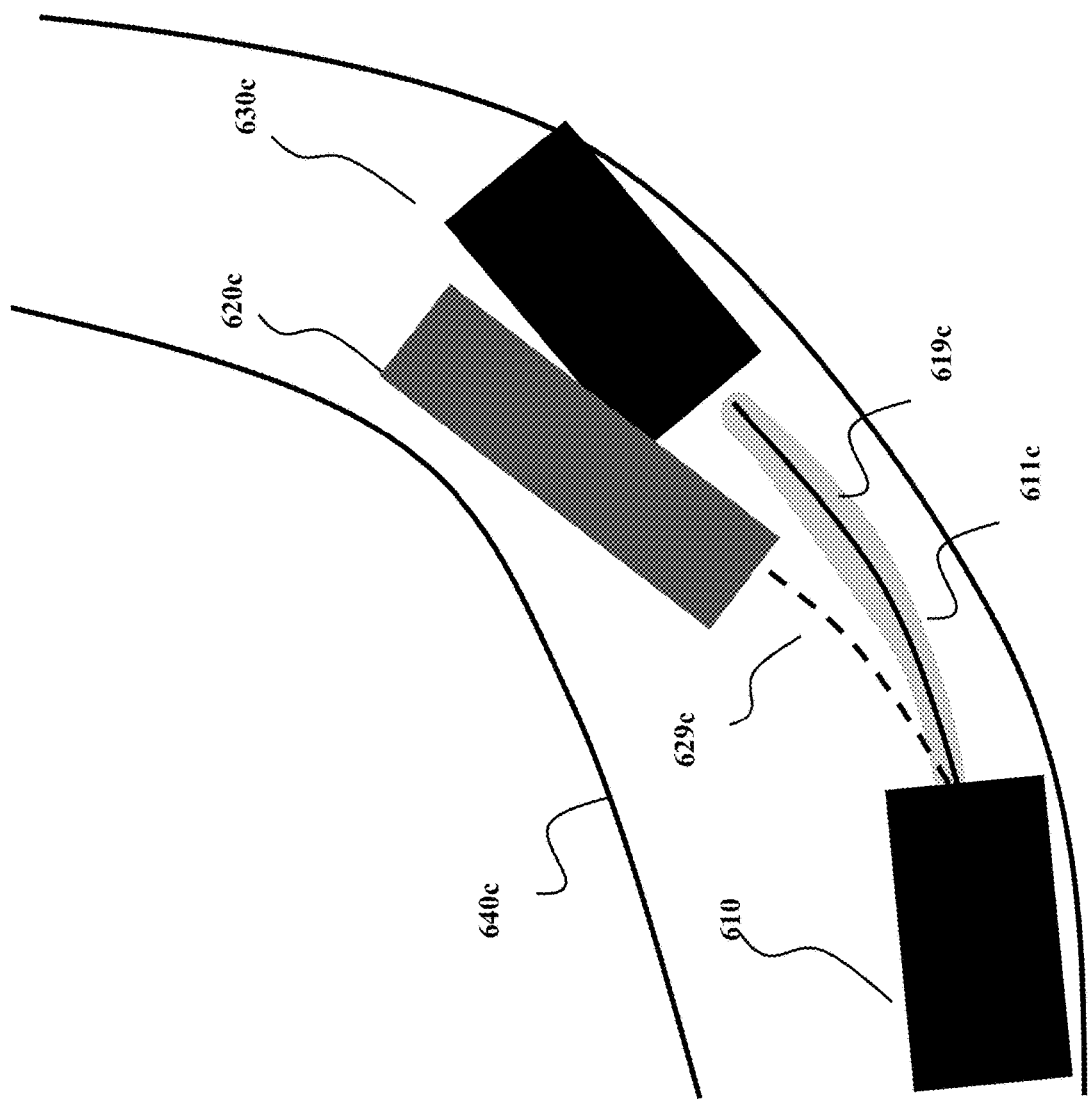
FIG. 6C shows a schematic of different motions determined according to some principles employed by various embodiments.

FIG. 6C shows a schematic of different motions determined according to some principles employed by various embodiments. The vehicle is estimated to be at the current state 610 on a road with road boundaries 640*c*, where the estimates of the current state 610 has been determined during previous iterations according to other embodiments of the invention. The lines 619*c* and 629*c* are two different motions determined using two different states of the stiffness, leading to two possible states 620*c* and 630*c* of the vehicle. The gray area 611*c* indicates the uncertainty of the sensors from the sensing system 230, i.e., the possible area where the motion is likely to occur, determined from the a priori known noise modeling of the sensors. Only the motion 619*c* is inside the uncertainty region. Hence, the state 620*c* resulting from the motion 629*c*, and the state of stiffness associated with the motion 629*c*, are given a low probability of being a good combination.

FIG. 6D shows the motion of the vehicle modeled in the form of a PDF 612*d* over the state of the vehicle, wherein the initial condition 609*d* of the PDF 612*d* has been determined during previous iterations according to some embodiments. In some of the embodiments, the motion is computed by; first determining several motions from initial states to end states, where the different motions are initiated according to the set of parameters of the wheels or tires belonging to that particular motion; second, determining how the different motions agree with the true motion sensed by the sensing system 230; third, determining parameters that are consistent with the determining how the different motions agree with the true motion sensed by the sensing system. To illustrate, FIG. 6D shows a situation where two different motions lead up to states 620*c* and 630*c*, respectively, and the PDF 612*d* of the motion of the vehicle both agree with the respective motions. However, after determining how the different motions agree with the PDF 611*c* of the sensing system, the PDF 631*d* is achieved, which does not agree with the state 620*c*. In certain embodiments of the invention, the resulting PDF 631*d* forms the basis for another iteration of the method.

Some embodiments determine a probability of each particle to represent a true state of the stiffness based on a difference between the state of the vehicle estimated using the state of stiffness of the particle and the measured state. For example, one embodiment determines such a probability using the PDF of the state of the vehicle.

FIG. 6E shows a graph illustrating selection of the probability of the sampled parameters using the PDF 631 over possible states of the vehicle according to one embodiment. For example, the PDF 631 can be a probability distribution of the measurement model. The shape of such a probability distribution can be determined in advance, e.g., as a Gaussian or different shape, and the location of this probability distribution 631 is centered on the measured state 635. To that end, one embodiment determines a probability distribution of the state of the vehicle and/or the state of the stiffness using a probability distribution 631 of the measurement model centered on the measured state. To that end, the embodiment can determine the probability of each particle to represent the true state of the stiffness according to a placement of the mean in the particle on the probability distribution of the state of the vehicle and the state of the stiffness.

For example, the embodiment submits the initial state and one sample of the parameter values to the model of the motion of the vehicle to estimate a transition of the vehicle from the initial state to a next state 621 and selects a value 622 of the PDF over states of the vehicle at a point 623 corresponding to the next state 621 as the probability of the state of the vehicle and/or the state of the stiffness to be accurate.

FIG. 6F shows another graph illustrating selection of the probability of the sampled parameters according to PDF 651, which is different from the PDF 631 of FIG. 6E. For example, the PDF 651 is the distribution updated based on a change of the measured state. In this example, the embodiment selects a value 642 of the PDF 651 over states of the vehicle at a point 643 corresponding to the next state 621 as the probability of the state of the vehicle and/or the state of the stiffness.

Figure 7A:
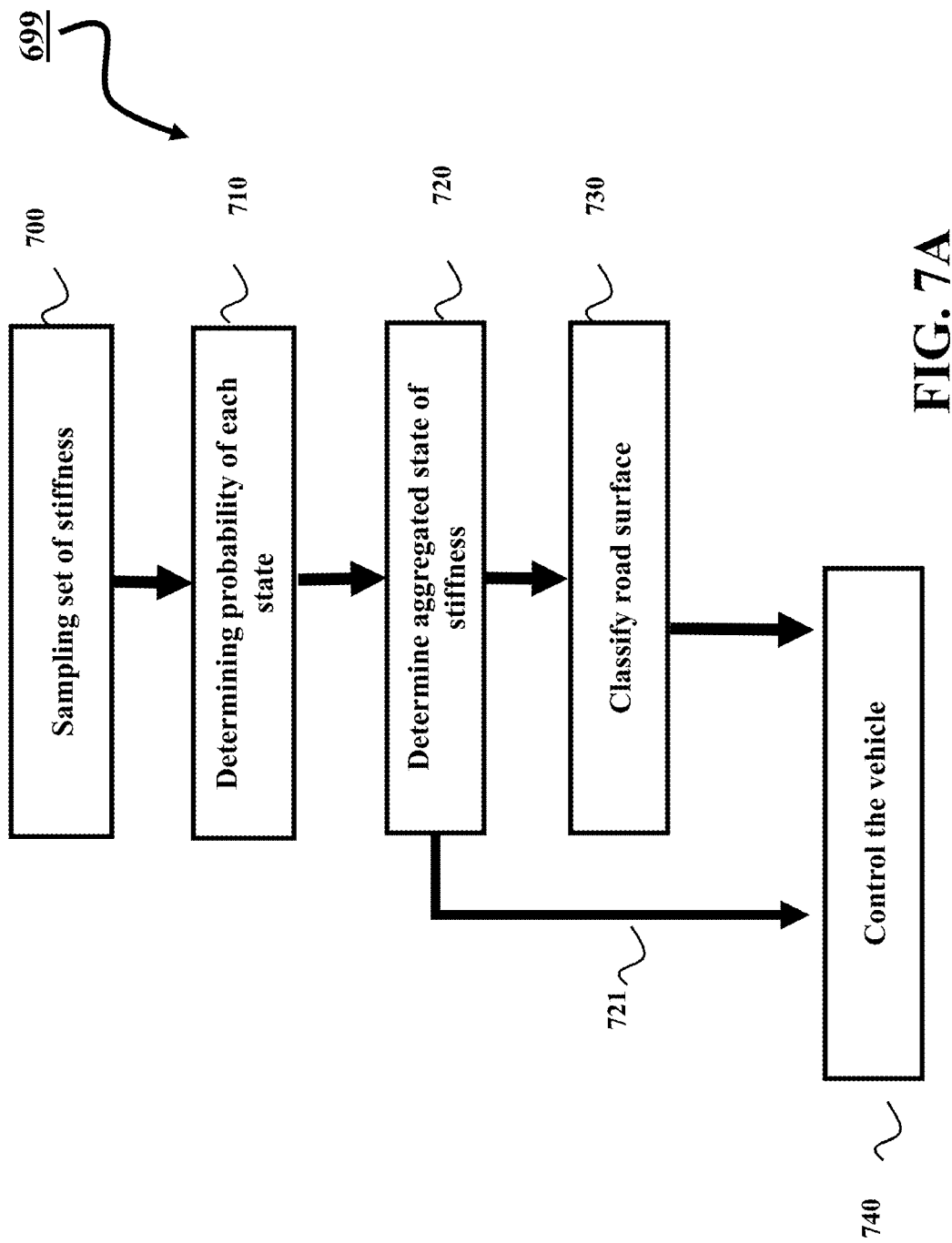
FIG. 7A shows a flowchart of one iteration of a method for estimating the state of stiffness and state of the vehicle, and to control the vehicle according to some embodiments.

FIG. 7A shows a flowchart of one iteration of a method 699 for estimating the state of stiffness and state of the vehicle, and to control the vehicle according to some embodiments. The method determines a set of parameter values and associated uncertainties, specifying the model of the vehicle, and state of the vehicle that explains the motion of the vehicle, starting from an initial state and an initial set of parameters. In different embodiments, the initial state of the vehicle is a current estimated state of the vehicle and/or wherein the initial state of the vehicle is the state of the vehicle corresponding to the state of stiffness determined during a previous iteration of the method.

The motion is defined by the state transitions connecting states of the vehicle, for example, as shown in FIG. 6A for a motion connecting two estimated states of the vehicle.

Each state includes at least a velocity and a heading rate of the vehicle. Steps of the method are performed by a processor 270 of the estimator 240 and/or of the vehicle. The motion is determined iteratively until a termination condition is met, for example, for a time period or for a predetermined number of iterations. An iteration of the method of FIG. 7A includes the following steps.

The method 699 determines 700 a set of sampled states of stiffness and a corresponding set of transitions to a set of states satisfying static and dynamic constraints on the state of the vehicle. For example, the method determines the state transitions 619c, 629c, and the states 630c, 620c, in FIG. 6C. Next, the method 699 determines 710 the probability of each state of stiffness sample in the step 700 to produce movement to a state consistent with the measurements of the motion of the vehicle.

Using the probability of each state as the probability of the particle of the state of stiffness used to estimate those state, the method 699 determines 720 the aggregated state of stiffness 721 according to the function that uses a weighted combination of the updated mean and the updated variance in each particle. For example, the weights in the combination are determined by the probability of each particle to represent the true state of the stiffness. Additionally, or alternatively, the function can just select the state of stiffness of the most likely particle. Other embodiments use different function for determining the state of stiffness 721, which can be used to control 740 the vehicle and/or the classify 730 the surface of the road.

Figure 7B:
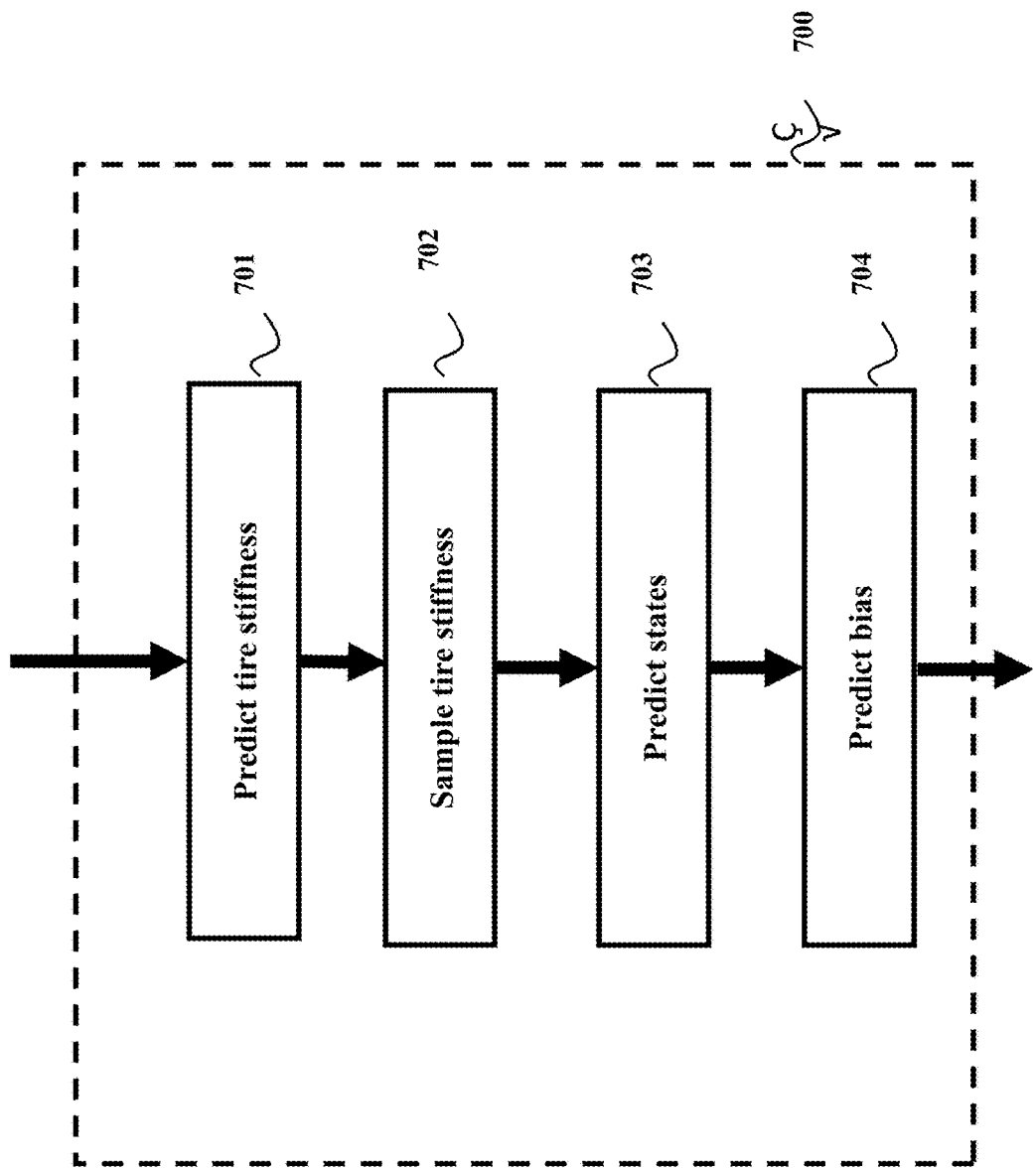
FIG. 7B shows a flowchart of an exemplar implementation of the determining the set of states of stiffness values according to one embodiment.

FIG. 7B shows a flowchart of an exemplar implementation of the determining 700 the set of states of stiffness values according to one embodiment. The determining 700 uses the actual inputs to the system and initial states estimated using previous iterations. The method first predicts 701 N means and variance for the set of particles $\{\mu_k^i, \Sigma_k^i\}_{i=1}^N$ from values determined during previous iterations. Then, the method samples 702 a set of N values of the state of stiffness, where N can be predetermined or made adaptive, and predicts 703 the states $\{x_k^i\}_{i=1}^N$ using the set of values of the state of stiffness. Then, the determining 700 predicts 704 the bias terms, i.e., the variance, that accounts for additional errors in the sensing or model that has not been accounted for yet.

In some embodiments, each value number i of the state of stiffness is generated using number i of $\{\mu_k^i, \Sigma_k^i\}_{i=1}^N$, which is a set of noise-source parameters of the dynamical system, i.e., from $w_k$, where $\mu_k^i$ denotes the estimated mean of the tire stiffness and $\Sigma_k^i$ the corresponding uncertainty, or variance. For example, $w_k$ can be chosen as arising from a Gaussian distribution $w_k \sim N(\mu_k, \Sigma_k)$, or can be chosen as a PDF tailored to the particular application. In some embodiments, to account for the uncertainty in the stiffness estimates themselves, a student-t distribution is used, which approaches the Gaussian for each iteration.

In some embodiments of the invention, the sampled parameter values 702 are generated by inverting the dynamical system. In such a case, in one embodiment, the states $\{x_k^i\}_{i=1}^N$ are instead generated by using a probabilistic function $q(x_k|x_{k-1}, y_k)$, and the sampled stiffness values are generated by inverting of the dynamical system to better satisfy the measurements. However, inverting the system model cannot always be done exactly.

Figure 7C:
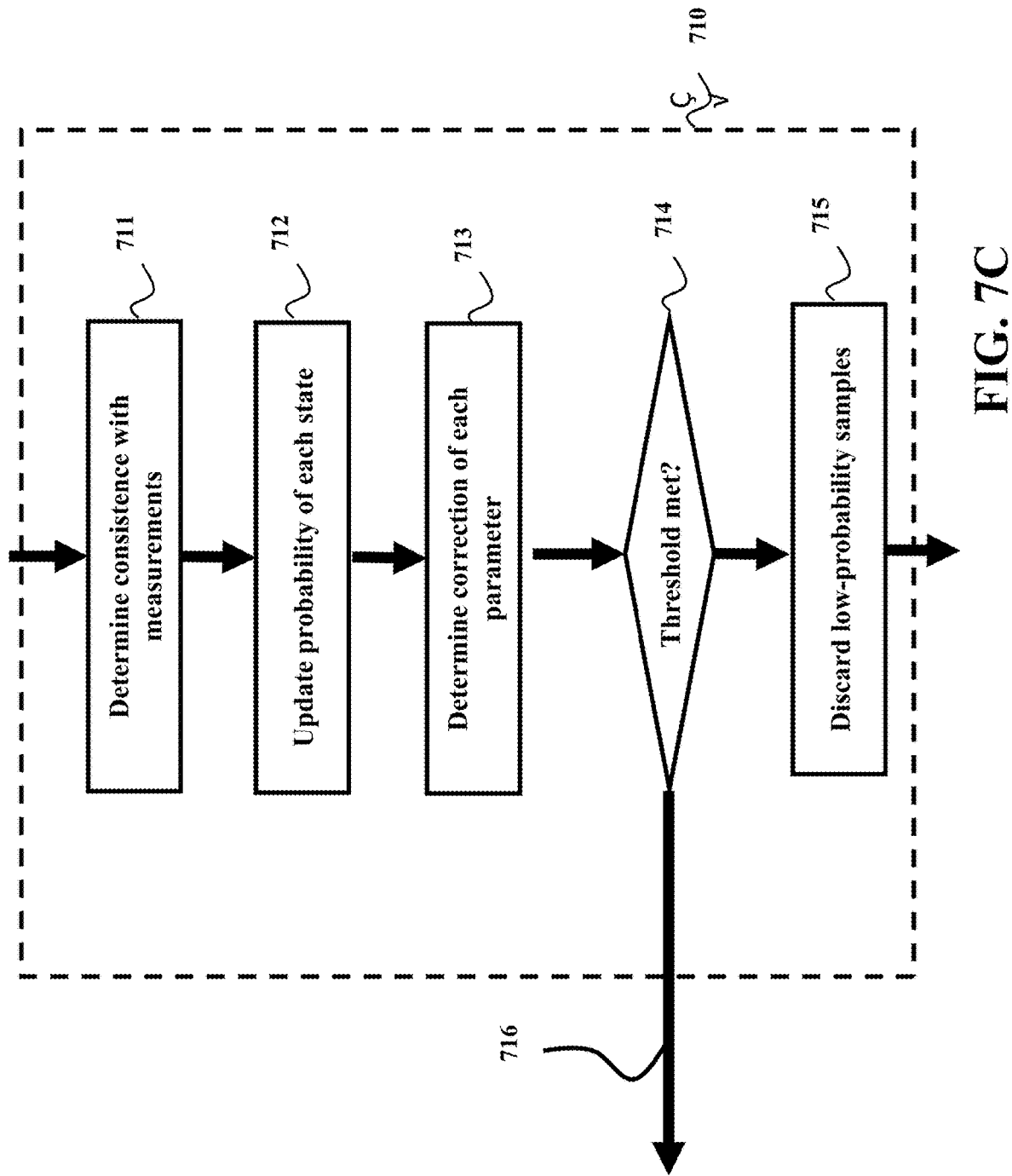
FIG. 7C shows a flowchart of the method that determines the probability of each sampled state of stiffness producing movement to a state consistent with the measurements of the motion of the vehicle according to some embodiments.

FIG. 7C shows a flowchart of the method 710 that determines the probability of each sampled state of stiffness producing movement to a state consistent with the measurements of the motion of the vehicle according to some embodiments. When determining the probability of each stiffness value, the consistence of the next state 702 with the measurement is determined 711 and the probability of each state is computed 712. For example, one embodiment determines the probability 712 using principles described in FIGS. 6E and 6F. In one embodiment of the method 710, if the so-called effective sample size is below a threshold 714, where the threshold can be predetermined, few stiffness values have a large probability of leading to a state consistent with the measurements of the motion of the vehicle, so the method duplicates samples and corresponding states with high probability and discards those with low probability 715. Otherwise, the method exits 716. Additionally or alternatively, in some embodiments, stiffness values and corresponding states with nonzero but low probability are replaced with inputs and states with higher probabilities. For example, one embodiment generates a new set of stiffness values and corresponding states in such a way that the probability of generating $x_k^i$ is at least $q_k^i$. In another embodiment, the replacement is performed whenever the inverse square sum of the probabilities is below some predefined threshold. Doing in such a manner ensures that only probably good stiffness values are used. In some embodiments of the invention, the determining 712 is done as a combination of the probability density function (PDF) of the measurements, $p(y_k|x_k^i, y_{0:k-1})$, the PDF of the dynamical system, and the probability $q_{k-1}^i$ of the input determined during previous iterations of the method 700. For example, if stiffness values are generated according to the uncertainty model of the parameters, the probabilities are proportional to the PDF of the measurements, i.e., $q_k^i \propto q_{k-1}^i p(y_k|x_k^i, y_{0:k-1})$. In one embodiment, the probabilities are normalized in such a way that they represent a PDF. Relating to FIG. 6F if $q_{k-1}^i$ is given by the value 642 at a point 643 on the PDF 651 determined during previous iterations corresponding to the state 621, the updated probability $q_k^i$ is determined as a multiplication of 622 and 642. The determining 713 of the tire parameters $\{\mu_k^i, \Sigma_k^i\}_{i=1}^N$ can be done in several ways. For example, one embodiment determines corrected parameters by using the sampled stiffness value $\overline{w}_k$ to correct each parameter set.

Figure 7D:
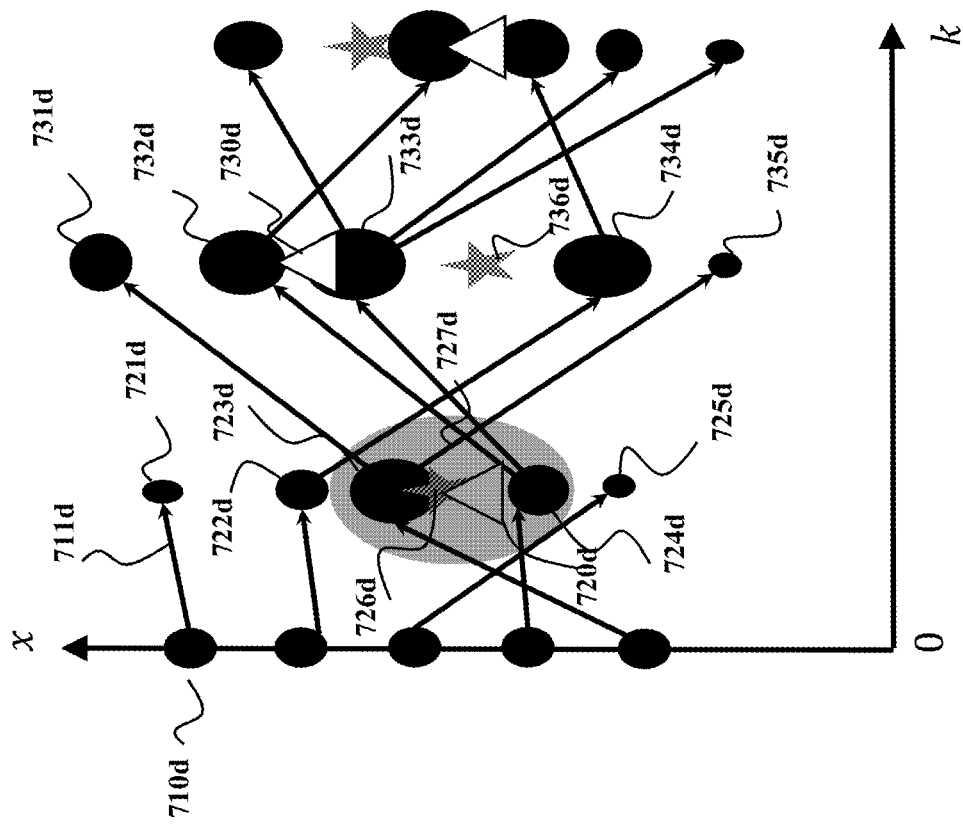
FIG. 7D shows a simplified schematic of the result of three iterations of the method when five sampled stiffness values are generated for each iteration according to some embodiments.

FIG. 7D shows a simplified schematic of the result of three iterations of steps 700, 710, and 720 when five sampled stiffness values are generated for each iteration according to some embodiments. The initial state 710d is predicted forward in time 711d using the model of the motion and the inputs to the system and the five sampled stiffness values, used to parameterize the dynamic model, to produce five next states 721d, 722d, 723d, 724d, and 725d. The probabilities are determined as a function of the measurement 726d and the model of the noise source and the bias 727d of the measurement 726d. At each time step, i.e., at each iteration, an aggregate of the probabilities is used to produce an aggregated set of tire parameters and corresponding state 720d. Referring back to FIG. 7C, if the threshold 714 is met, high-probability states and corresponding parameters and bias terms are duplicated and become the initial states for the next iteration that again produces five sampled stiffness values transitioning the state of the vehicle from the initial state 721d, 722d, 723d, and 724d to next states 731d, 732d, 733d, 734d, and 735d. The control input corresponding to the state 730d is selected according the probabilities of the sampled control inputs of this iteration. The states 732d, 733d, and 734d are the initial states for the next iteration in this particular example, but in general, all states could be expanded forward in time.

Figure 7E:
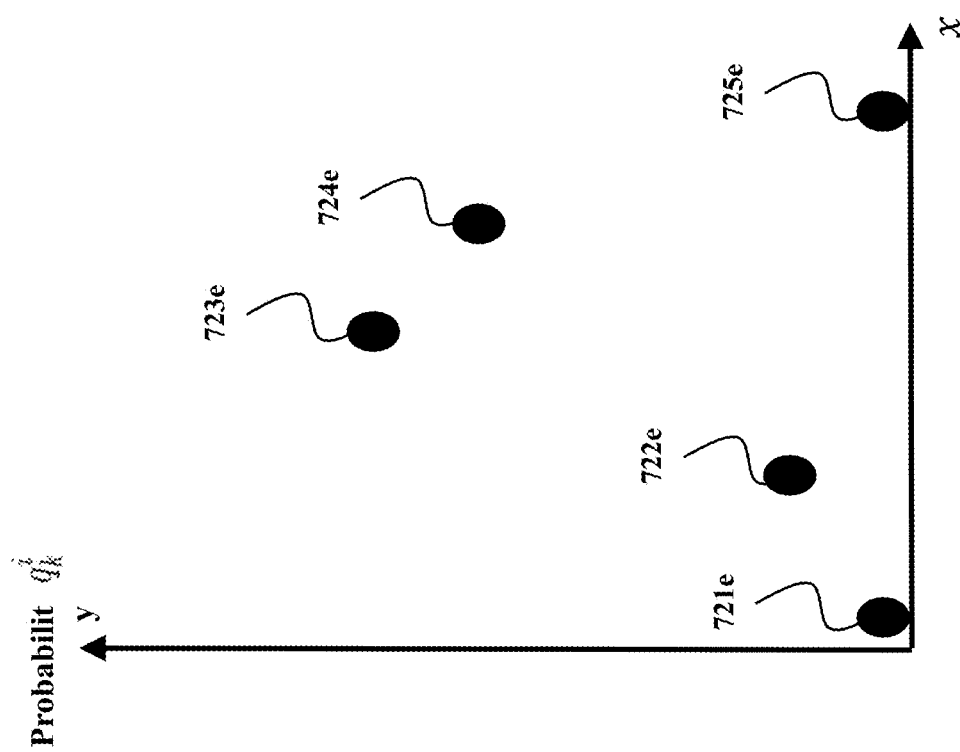
FIG. 7E shows possible assigned probabilities of the five states at the first iteration in FIG. 7D.

FIG. 7E shows possible assigned probabilities of the five states at the first iteration in FIG. 7D. Those probabilities 721e, 722e, 723e, 724e, and 725e are reflected in selecting the sizes of the dots illustrating the states 721d, 722d, 723d, 724d, and 725d.

Figure 8:
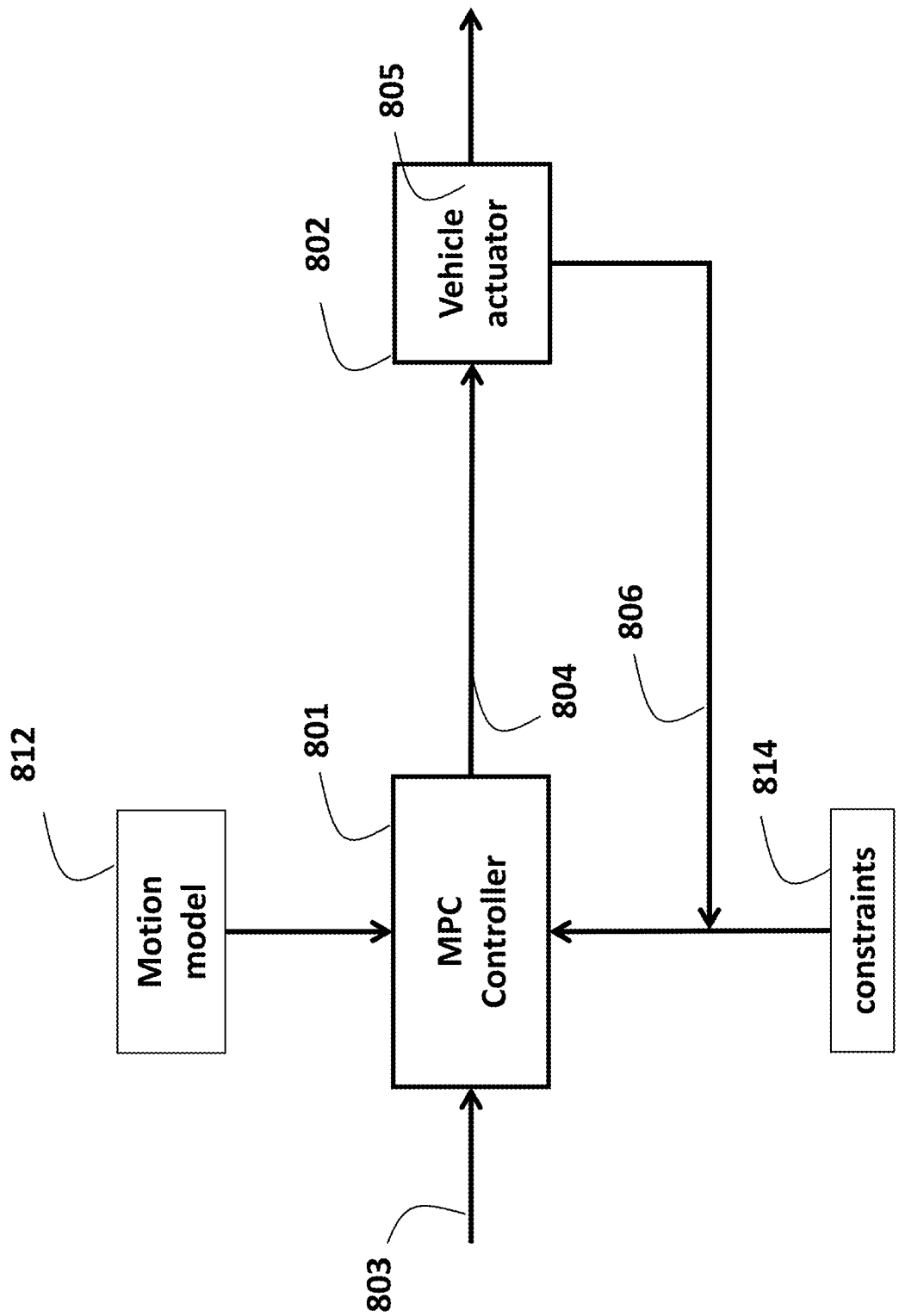
FIG. 8 shows a block diagram of a control system for controlling an operation of actuators of a vehicle according to one embodiment.

FIG. 8 shows a block diagram of a control system 801 for controlling an operation of actuators 802 of a vehicle according to one embodiment. The actuator 802 is a device whose operation changes quantities such as positions, velocities, currents, temperatures, numerical values, in response to commands. As used herein, the operation of the actuator determines a motion of the vehicle that changes such quantities. The control system receives a desired motion 803 for the vehicle, such as a desired trajectory or target point for some of the states, and controls the vehicle via control inputs 804 determined using a motion model 812 of the vehicle. The control inputs can include commands to change parameters of the operation of the vehicle or can include actual values of the parameters such as voltages, pressures, torques, forces that affect the vehicle motion resulting in the generation of quantities 805 for the vehicle.

The control system 801 receives information 806 about the vehicle motion, from sensors, hardware, or software connected directly or remotely to the vehicle. The information 806 includes a state of the vehicle. The vehicle uses the state for the selection of the control inputs 804. The information 806 can include some or all of the motion quantities 805 and can also include additional information about the vehicle. The quantities 805, the control inputs 804 or a combination thereof, can be requested to remain in some pre-defined ranges according to constraints 814 on the operation of the vehicle. For instance, constraints 814 can model a maximum allowed deviation from the middle lane of the road or a maximum heading rate of the vehicle.

To avoid determining the current friction coefficient and the entire tire friction function, one implementation stores in a database the parameters. In one embodiment, the motion model is modeled as a single-track model with nonlinear $$\dot{v}_x - v_y\dot{\psi} = \frac{1}{m}(F_{x,f}\cos(\delta) + F_{x,r} - F_{y,f}\sin(\delta)),$$

$$\dot{v}_y + v_x\dot{\psi} = \frac{1}{m}(F_{y,f}\cos(\delta) + F_{y,r} + F_{x,f}\sin(\delta)),$$

tire force as $I_{zz}\ddot{\psi}=l_fF_{y,f}\cos(\delta)-l_rF_{y,r}+l_fF_{x,f}\sin(\delta)$, where the nominal forces are modeled using the Pacejka tire model as $F_{0,i}{}^x=\mu_i^x F_i^x \sin(C_i^x \arctan(B_i^x(1-E_i^x)\lambda_i+E_i^x \arctan(B_i^x\lambda_i)))$, $F_{0,i}{}^y=\mu_i^y F_i^y \sin(C_i^y \arctan(B_i^y(1-E_i^y)\alpha_i+E_i^y \arctan(B_i^x\alpha_i)))$, where the nominal forces are the forces under pure slip, i.e., when one of the longitudinal slip and lateral slip are zero.

Some embodiments, instead of determining the tire parameters in the Pacejka model, to be used in the tire friction function, use a linear approximation of the tire forces as $F^x \approx C_i^x \lambda$, $F^y \approx C_i^y \alpha$, for the longitudinal and lateral tire force, where the C constants are the stiffness components. Consequently, one embodiment estimates the stiffness component using a stochastic model of the stiffness as a disturbance to the motion model, $C_i^x=C_{i,n}^x+\Delta C_i^x$, $C_i^y=C_{i,n}^y+\Delta C_i^y$ where $C_{i,n}$ is the nominal stiffness value, for example, a priori determined on a nominal surface, and $\Delta C_s$ is a time-varying, unknown part which is estimated according to one embodiment. One implementation estimates the mean value and variance of the tire stiffness.

Additionally or alternatively, one embodiment estimates the tire stiffness and compares to the tire parameters stored in memory according to a linear approximation of the Pacejka model, $F^y \approx \mu_i^y F_i^z C_i^y B_i^i \alpha_i$, which gives that the tire stiffness and parameters should be equal, $\mu_i^y F_i^z C_i^y B_i^i = C_i^y$. However, since measurement and estimation errors, and nonperfect parameters stored in memory, give tire stiffness estimates that deviate from the ones stored in memory, one embodiment uses the estimated variance of the tire stiffness to determine the best fit according to the parameters, by selecting the parameters maximizing the likelihood of the parameters, $\theta^*=\arg\max N(\mu_{i,j}^y F_i^z C_{i,j}^y B_{i,j}^y | \Sigma_k, \Sigma_k)$.

Yet another embodiment uses a test statistic to determine whether the estimated stiffness can be regarded as outliers or inliers from the parameters. Consequently, one embodiment choose the parameters $\theta_1$ corresponding to the lowest friction surface if $T(\mu_{i,1}^y F_i^z C_{i,1}^y B_{i,1}^y) > x_k^2$, where $x_n^2(1)$ is the Chi-squared distribution with one degree of freedom and some significance level η. Otherwise, the embodiment proceeds in order of increasing peak friction until a parameter set is found.

Since the selected parameters define the tire friction function as a function of the slippage of the wheel, determining a value of the tire friction function can be done by inserting a value of the current slip into the tire friction function, thus resulting in a value of the friction that is representable of the actual friction for both normal and aggressive driving. Furthermore, according to various embodiments, the selected tire friction function is used to determine a variation of friction as a function of variation of slippage of the wheel over a prediction horizon of an MPC.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling a vehicle moving on a road, comprising:

an input interface configured to accept measurements indicative of a state of the vehicle;

a memory configured to store parameters of multiple friction functions, each friction function describes a friction between a type of surface of the road and a tire of the vehicle as a non-linear function of a slip of a wheel of the vehicle, the parameters of each friction function include an initial slope of the friction function defining a stiffness of the tire, a peak friction, and one or combination of a shape factor and a curvature factor of the friction function; and at least one processor programmed to execute elements of executable components of the system including:

a signal conditioner configured to process the measurements to estimate a signal including the slip of the wheel of the vehicle;

a stiffness estimator configured to estimate a current state of the stiffness of the tire of the wheel of the vehicle using one or combination of the signal estimated by the signal conditioner and the measurements accepted by the input interface, wherein the stiffness estimator includes a filter configured to determine the current state of the stiffness of the tire by comparing a current state of the vehicle estimated using the stiffness of the tire with measurements of the current state of the vehicle;

a parameter selector configured to select from the memory parameters of the friction function corresponding to the current stiffness of the tire, wherein the selected parameters define a linear part and a non-linear part of the friction function and include the stiffness of the tire, the peak friction, and one or combination of the shape factor and the curvature factor of the friction function; and a controller configured to determine a control command using a value of the friction corresponding to the slip of the tire according to the friction function defined by the selected parameters, and submit the control command to an actuator of the vehicle to move the vehicle on the road.

2. The system of claim 1, wherein the filter is a probabilistic filter configured to determine a probabilistic distribution of the current state of the stiffness of the tire with a mean indicative of the type of the surface of the road and a variance indicative of uncertainty caused by external disturbances.

3. The system of claim 2, wherein the parameter selector selects the parameters of the friction function including the stiffness with the highest probability according to the probabilistic distribution of the current state of the stiffness above a threshold.

4. The system of claim 2, wherein the filter is a probabilistic filter configured to determine a probabilistic distribution of the current state of the stiffness of the tire, wherein the parameter selector selects the parameters of the friction function including the stiffness with a probability according to the probabilistic distribution of the current state of the stiffness above a corresponding threshold, wherein different thresholds correspond to different friction functions.

5. The system of claim 4, wherein a threshold corresponding to the friction function is proportional to a value of the peak friction of the friction function, such that a first threshold for a first friction function having a first peak friction is less than a second threshold for a second friction function having a second peak friction when the second peak friction is larger than the first peak friction.

6. The system of claim 2, wherein the filter is a Kalman filter.

7. The system of claim 2, wherein the filter is a particle filter.

8. The system of claim 7, wherein the particle filter is configured to represent the state of stiffness with a set of particles, each particle includes a mean and a variance of the state of stiffness defining a feasible space of the state of stiffness;

update the mean and the variance of the set of particles using a difference between an estimated state of stiffness estimated using the motion model of the vehicle including the state of stiffness sampled on the feasible space and the measured state of stiffness determined according to a measurement model using the measurements of the current state of the vehicle; and determining the mean and the variance of the probabilistic distribution of the current state of the stiffness as a function of the updated mean and the updated variance of each particle in the set of particles.

9. The system of claim 8, wherein the particle filter is configured to determine a probability of each particle to represent a true state of the stiffness based on a difference between the state of the vehicle estimated using the state of stiffness of the particle and the measured state of the vehicle; and determine the state of stiffness according to the function that uses a weighted combination of the updated mean and the updated variance in each particle, wherein the weights in the combination are determined by the probability of each particle to represent the true state of the stiffness.

10. The system of claim 9, wherein the particle filter is configured to determine a probability distribution of the state of stiffness using a probability distribution of the measurement model centered on the measured state; and determine the probability of each particle to represent the true state of the stiffness according to a placement of the mean in the particle on the probability distribution of the state of the vehicle and the state of the stiffness.

11. The system of claim 2, wherein the parameter selector is configured to classify the type of the surface of the road using the mean and variance of the state of stiffness; and retrieve the parameters of the friction function from the memory corresponding to the type of the surface.

12. The system of claim 11, wherein to classify the type of surface the parameter selector is configured to determine the type of the surface based on a value of the mean of the state of stiffness unless the variance of the state of stiffness covers a value corresponding to a different type of the surface; and otherwise select the type of surface covered by the variance of the state of stiffness with smallest value of the peak friction.

13. The system of claim 1, wherein the controller is a model predictive controller (MPC) configured to determine the control command using a motion model of the vehicle including the parameters of the friction function.

14. The system of claim 13, wherein the MPC predicts a variation of the friction over a prediction horizon based on prediction of a variation of the slip over the prediction horizon and determines the control command using the variation of the friction over the prediction horizon.

15. The system of claim 14, wherein the control command is determined by solving the MPC problem formulated as a nonlinear program.

16. The system of claim 15, wherein the nonlinear program is solved by sequential quadratic programming using a real-time iteration scheme.

17. A method for controlling a vehicle moving on a road, wherein the method uses a processor coupled to a memory storing parameters of multiple friction functions, each friction function describes a friction between a type of surface of the road and a tire of the vehicle as a non-linear function of a slip of a wheel of the vehicle, the parameters of each friction function include an initial slope of the friction function defining a stiffness of the tire, a peak friction, and one or combination of a shape factor and a curvature factor of the friction function, wherein the processor is coupled with stored instructions implementing the method, wherein the instructions, when executed by the processor carry out steps of the method, comprising:
  accepting measurements indicative of a state of the vehicle;
  processing the measurements to estimate a signal including the slip of the wheel of the vehicle;
  estimating a current state of the stiffness of the tire of the wheel of the vehicle using one or combination of the signal estimated by the signal conditioner and the measurements accepted by the input interface, wherein the current state of the stiffness of the tire is determined by comparing a current state of the vehicle estimated using the stiffness of the tire with measurements of the current state of the vehicle;
  selecting from the memory parameters of the friction function corresponding to the current stiffness of the tire, wherein the selected parameters define a linear part and a non-linear part of the friction function and include the stiffness of the tire, the peak friction, and one or combination of the shape factor and the curvature factor of the friction function;
  determining a control command using a value of the friction corresponding to the slip of the tire according to the friction function defined by the selected parameters; and
  submitting the control command to an actuator of the vehicle to move the vehicle on the road.

18. The method of claim 17, further comprising:
  determining the current state of the stiffness of the tire by comparing a current state of the vehicle estimated using the stiffness of the tire with measurements of the current state of the vehicle, wherein the current state of the stiffness is determined probabilistically as a probabilistic distribution of the current state of the stiffness of the tire with a mean indicative of the type of the surface of the road and a variance indicative of uncertainty caused by external disturbances.

19. A non-transitory computer readable storage medium embodied thereon a program executable by a processor for performing a method, wherein the medium is configured to store parameters of multiple friction functions, each friction function describes a friction between a type of surface of the road and a tire of the vehicle as a non-linear function of a slip of a wheel of the vehicle, the parameters of each friction function include an initial slope of the friction function defining a stiffness of the tire, a peak friction, and one or combination of a shape factor and a curvature factor of the friction function, the method comprising:
  accepting measurements indicative of a state of the vehicle;
  processing the measurements to estimate a signal including the slip of the wheel of the vehicle;
  estimating a current state of the stiffness of the tire of the wheel of the vehicle using one or combination of the signal estimated by the signal conditioner and the measurements accepted by the input interface, wherein the current state of the stiffness of the tire is determined by comparing a current state of the vehicle estimated using the stiffness of the tire with measurements of the current state of the vehicle;
  selecting from the memory parameters of the friction function corresponding to the current stiffness of the tire, wherein the selected parameters define a linear part and a non-linear part of the friction function and include the stiffness of the tire, the peak friction, and one or combination of the shape factor and the curvature factor of the friction function;
  determining a control command using a value of the friction corresponding to the slip of the tire according to the friction function defined by the selected parameters; and
  submitting the control command to an actuator of the vehicle to move the vehicle on the road.

20. A system for controlling a vehicle moving on a road, comprising:
  an input interface configured to accept measurements indicative of a state of the vehicle;
  a memory configured to store parameters of multiple friction functions, each friction function describes a friction between a type of surface of the road and a tire of the vehicle as a function of a slip of a wheel of the vehicle, the parameters of each friction function include an initial slope of the friction function defining a stiffness of the tire and one or combination of a peak friction, a shape factor and a curvature factor of the friction function; and
  at least one processor programmed to execute elements of executable components of the system including:
    a signal conditioner configured to process the measurements to estimate a signal including the slip of the wheel of the vehicle;
    a stiffness estimator configured to estimate a current state of the stiffness of the tire of the wheel of the vehicle using one or combination of the signal estimated by the signal conditioner and the measurements accepted by the input interface, wherein the stiffness estimator includes a filter configured to determine the current state of the stiffness of the tire by comparing a current state of the vehicle estimated using the stiffness of the tire with measurements of the current state of the vehicle, wherein the filter is a probabilistic filter configured to determine a probabilistic distribution of the current state of the stiffness of the tire with a mean indicative of the type of the surface of the road and a variance indicative of uncertainty caused by external disturbances;
    a parameter selector configured to select from the memory parameters of the friction function corresponding to the current stiffness of the tire, wherein the selected parameters define a linear part and a non-linear part of the friction function and include the stiffness of the tire, the peak friction, and one or combination of the shape factor and the curvature factor of the friction function, wherein the parameter selector is configured to classify the type of the surface of the road using the mean and variance of the state of stiffness and retrieve the parameters of the friction function from the memory corresponding to the type of the surface, wherein to classify the type of surface the parameter selector is configured to determine the type of the surface based on a value of the mean of the state of stiffness unless the variance of the state of stiffness covers a value corresponding to a different type of the surface; and otherwise select the type of surface covered by the variance of the state of stiffness with smallest value of the peak friction; and a controller configured to determine a control command using a value of the friction corresponding to the slip of the tire according to the friction function defined by the selected parameters, and submit the control command to an actuator of the vehicle to move the vehicle on the road.

* * * * *